United States Patent
Numata

(10) Patent No.: US 8,054,346 B2
(45) Date of Patent: Nov. 8, 2011

(54) VIDEO INPUT PROCESSOR, IMAGING SIGNAL-PROCESSING CIRCUIT, AND METHOD OF REDUCING NOISES IN IMAGING SIGNALS

(75) Inventor: Hajime Numata, Tokyo (JP)

(73) Assignee: Sony Corporation, Tokyo (JP)

( * ) Notice: Subject to any disclaimer, the term of this patent is extended or adjusted under 35 U.S.C. 154(b) by 874 days.

(21) Appl. No.: 12/081,542

(22) Filed: Apr. 17, 2008

(65) Prior Publication Data

US 2008/0284880 A1 Nov. 20, 2008

(30) Foreign Application Priority Data

May 17, 2007 (JP) ................... 2007-131557

(51) Int. Cl.
*H04N 5/217* (2006.01)
*H04N 5/228* (2006.01)
(52) U.S. Cl. .................... 348/241; 348/222.1
(58) Field of Classification Search ............... 348/222.1, 348/241
See application file for complete search history.

(56) References Cited

U.S. PATENT DOCUMENTS 7,589,771 B2 * 9/2009 Hosaka et al. ................ 348/252

FOREIGN PATENT DOCUMENTS

| JP | 2001-078204 | 3/2001 |
|---|---|---|
| JP | 2002-374539 | 12/2002 |
| JP | 2004-032243 | 1/2004 |
| JP | 2005-006066 | 1/2005 |
| JP | 2005-303704 | 10/2005 |
| JP | 2006-180269 | 7/2006 |

* cited by examiner

*Primary Examiner* — William Choi
(74) *Attorney, Agent, or Firm* — Rader, Fishman & Grauer PLLC

(57) ABSTRACT

A video input processor is disclosed. The processor includes: an imaging signal-generating portion configured to image a subject and producing first imaging signals containing visible light components and a second imaging signal containing near-infrared light components; a gain adjustment portion configured to adjustably set a maximum gain value according to a relative magnitude between the visible light components and the near-infrared light components and adjust a gain for the first imaging signals at the set maximum gain value; and a noise reduction portion configured to reduce noises in the first imaging signals after the gain has been adjusted.

11 Claims, 13 Drawing Sheets

$K = \Sigma A - \alpha \Sigma R - \beta \Sigma G - \gamma \Sigma G$
OR $(\Sigma A)/(\alpha \Sigma R + \beta \Sigma G + \gamma \Sigma G)$
OR ...

W CHECKER

| R | W | B | W |
|---|---|---|---|
| W | G | W | G |
| R | W | B | W |
| W | G | W | G |

W ZIGZAG CHECKER

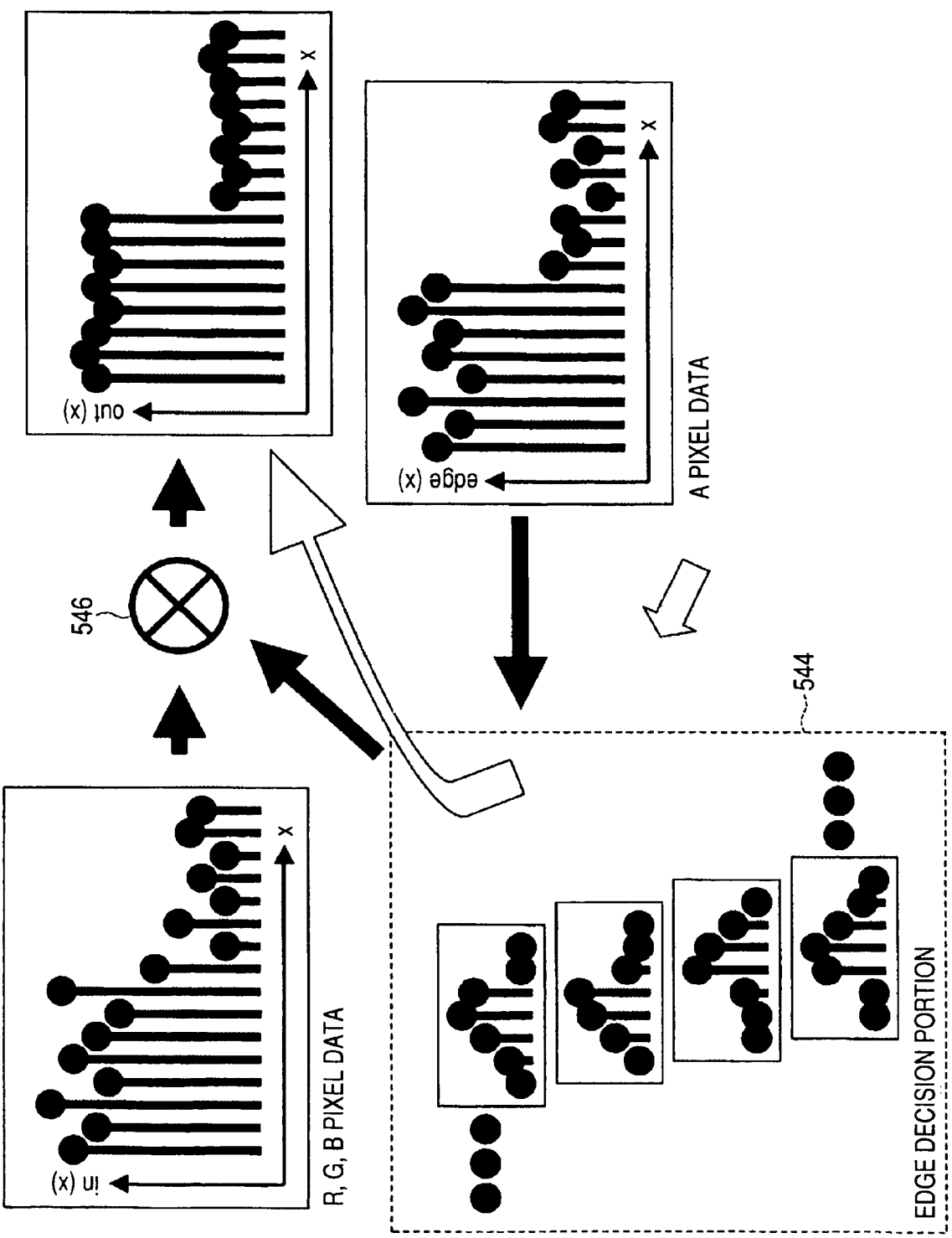

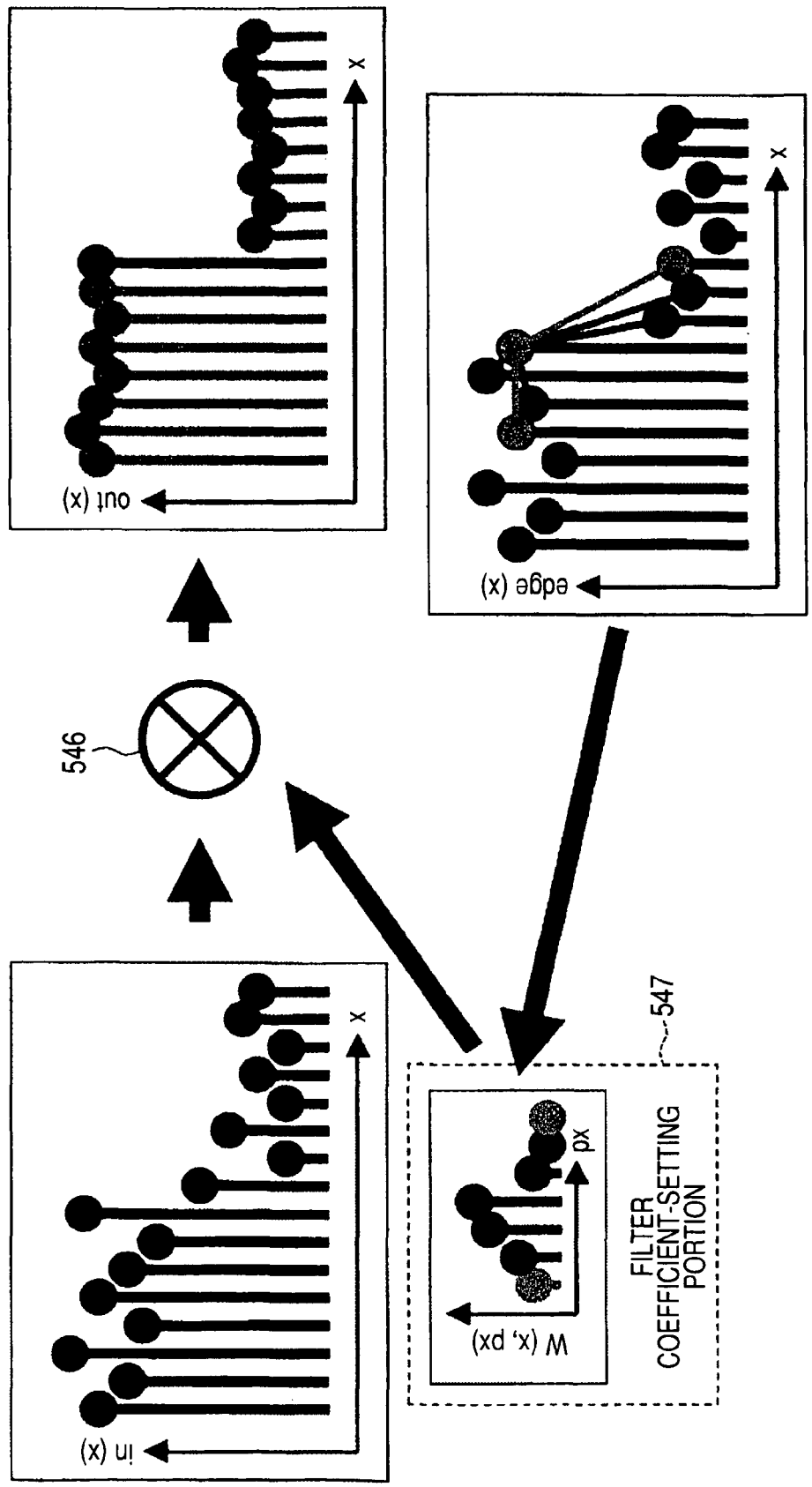

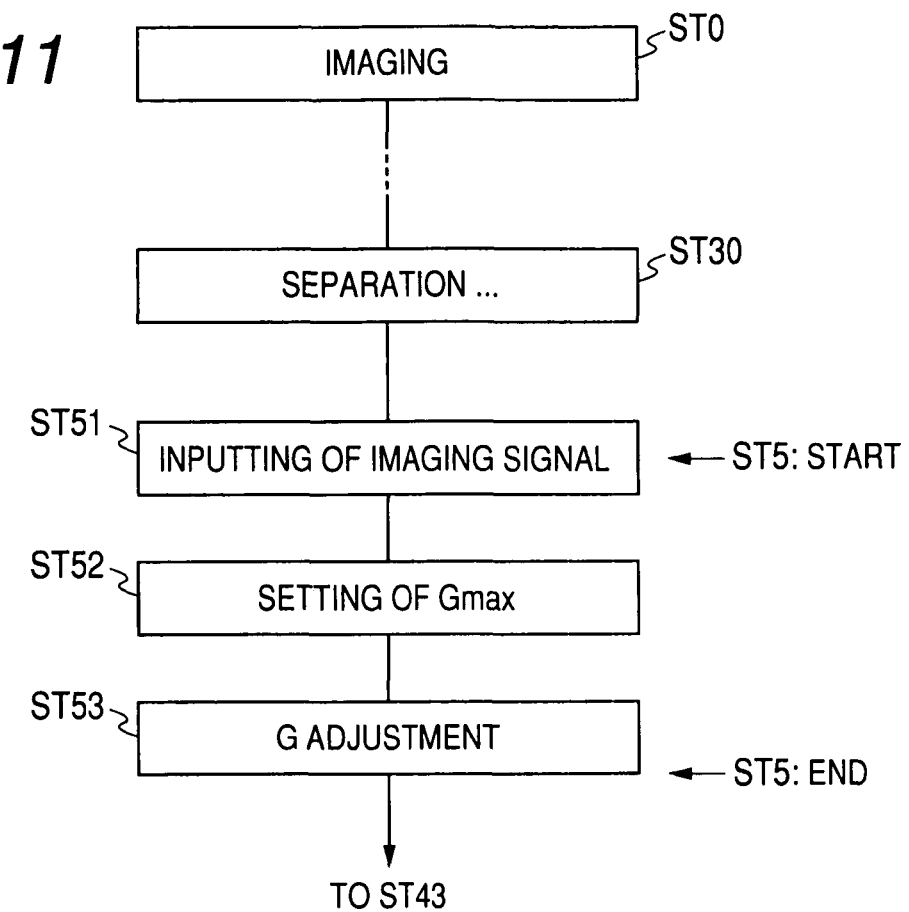
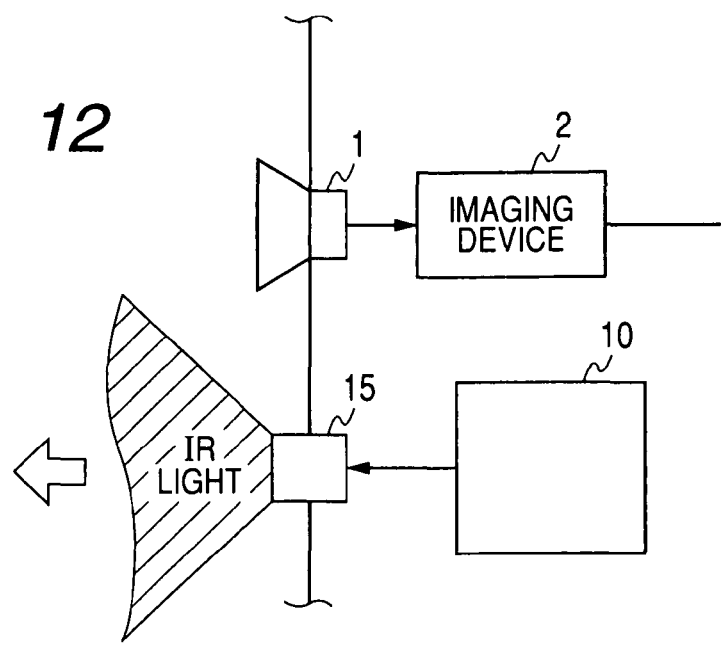

VIDEO INPUT PROCESSOR, IMAGING SIGNAL-PROCESSING CIRCUIT, AND METHOD OF REDUCING NOISES IN IMAGING SIGNALS

CROSS REFERENCES TO RELATED APPLICATIONS

The present invention contains subject matter related to Japanese Patent Application JP2007-131557 filed in the Japanese Patent Office on May 17, 2007, the entire contents of which being incorporated herein by reference.

BACKGROUND OF THE INVENTION

1. Field of the Invention

The present invention relates to a video input processor for imaging a subject and suppressing noise components of produced imaging signals by signal processing. The invention also relates to an imaging signal-processing circuit and to a method of reducing noises in the imaging signals.

2. Description of the Related Art

When a subject is imaged by a camera device designed to image a motion picture sequence or still images, for example, with enhanced ISO sensitivity, the automatic exposure function is activated. This shortens the exposure time of the sensor (imaging device) and increases the gain for the output signal from the sensor. Therefore, the effects of noises produced by the sensor itself and by ICs located around it become more conspicuous. As a result, the final image becomes a noisy image with poor signal-to-noise ratio.

Noises are produced by factors associated with the sensor itself and by various other ambient factors such as the operating frequency of an IC located around the sensor. Furthermore, the image is affected by various noise patterns of from low to high frequencies due to variations in characteristics of the signal source (sensor) itself and timewise variations of the signal source.

A known technique for performing signal processing inside a camera device to reduce or suppress noise uses a circuit employing a filter having a large number of taps for noise reduction. The signal-to-noise ratio of the displayed image is improved by processing performed by this circuit.

However, if processing is performed by an ordinary low-pass filter (such as a Gaussian filter) having a large number of taps, edge information will be diffused concomitantly. In the output image, the steepness of each edge drops and the apparent resolution deteriorates. To solve this problem, a noise reduction technique which improves the S/N of the input image by performing filtering processing while maintaining the resolution may be necessary during processing of camera signals.

One known approach for noise reduction uses an imaging device equipped with given color filters such as red (R), green (G), and blue (B) filters. Light from a subject is passed through an IR (infrared radiation) cut filter for cutting invisible radiation components, especially in the near-infrared region. The radiation transmitted through the IR cut filter is received by the imaging device having the color filters. An image having high color reproducibility is outputted from the imaging device. In addition, the same subject is imaged, and the resulting image is not transmitted through the IR cut filter to obtain the image with a larger amount of information. Edge information is detected from the image whose amount of information is maintained by not allowing the image to pass through the IR cut filter (see, for example, JP-A-2006-180269 (patent reference 1)).

In the above-cited patent reference 1, the image for deriving the edge information is referred to as invisible light image (in the embodiment, referred to as the infrared light image). This image holds image information containing a wide range of frequency components from low to high frequencies, the image information being obtained before the image is passed through the IR cut filter.

In the above-cited patent reference 1, the invisible light image (infrared light image) is passed through a high-pass filter to extract high-frequency components. Meanwhile, the visible light image, i.e., the image which has high color reproducibility and which is captured after being passed through the IR cut filter, is adjusted in terms of gain. Then, the image is passed through a low-pass filter, removing noises. However, when the image is passed through the low-pass filter, resolution information is diffused, deteriorating the steepness of each edge. Therefore, in the technique of the above-cited patent reference 1, the visible light image passed through the low-pass filter and the infrared light image passed through the high-pass filter are combined, the infrared light image holding edge information. Consequently, noise reduction and prevention of diffusion of edge information (deterioration of the steepness of each edge) are achieved simultaneously.

With respect to the IR cut filter, a function of selectively transmitting and blocking infrared light components can be imparted to a single color filter layer of an imaging device.

For example, JP-A-2005-006066 (patent reference 2) discloses a color filter array whose pixel units are each made up of transmission filters of the three primary colors of red (R), green (G), and blue (B) and an infrared pass filter which has sensitivity to the infrared region and which transmits infrared light. Patent reference 2 states that the infrared filter can be a white (W) filter.

On the other hand, with respect to gain adjustment, color correction, and noise reduction performed during white balance adjustment, processing of imaging signals having infrared light components is known (see JP-A-2001-078204 and JP-A-2005-303704 (patent references 3 and 4)).

SUMMARY OF THE INVENTION

Pixels each having color filters of red (R), green (G), blue (B), and white (W) can be disposed in a 2×2 arrangement, for example, similarly to the imaging device shown in patent reference 2. The pixel unit is repeatedly arranged in two dimensions. An infrared pass filter for transmitting infrared (IR) light can be formed on only the white (W) pixels. Consequently, visible light images of R, G, and B and an infrared light image (W+IR) (hereinafter may be referred to as the A (an abbreviation of All) image) can be outputted from one imaging device.

The technique described in patent reference 1 can perform processing for noise reduction on a visible light image by using R, G, and B images obtained as described above as visible light images and using the A image as an infrared light image.

The configuration of an image-processing portion described in patent reference 1 is shown in FIG. 13. The illustrated image-processing portion, indicated by 100, has again adjustment portion 101, a low-pass filter (LPF) 102 acting as a noise reduction portion, a high-pass filter (HPF) 103, and an image synthesizer portion 104.

The gain adjustment portion 101 adjusts the gain for the input visible light image. This increases the gray level (pixel value) at each pixel for a visible light image captured as a dark image due to underexposure such that the final pixel value approaches the value of an image captured at an appropriate exposure. One method of adjusting the gain is to multiply the pixel value of a visible light image by a constant factor. Another method is gamma correction based on an exponential function. A further method is an arbitrary method of adjusting the gain based on a polynomial function.

The low-pass filter 102 contains an edge detection portion. Edges are detected from an infrared light image having a larger amount of information by means of the edge detection portion. The low-pass filter 102 acting as a noise-reducing portion performs low-pass filtering while preserving information at the detected edges. Thus, noises are removed from the visible light image. The low-pass filter outputs a base image to the image synthesizer portion 104.

Meanwhile, the high-pass filter 103 extracts detailed portions close to edges from the input infrared light image and outputs the obtained detailed image (edge texture information) to the image synthesizer portion 104.

The image synthesizer portion 104 combines the base image derived from the low-pass filter 102 and the detailed image (edge texture information) from the high-pass filter 103, producing an output image.

Where the subject is dark, the amount of information contained in the visible light image is small. If this is intact passed through the low-pass filter 102 and noise reduction is performed, the output image remains dark. Accordingly, the signal level is amplified by the gain adjustment portion 101, and then noise reduction using the low-pass filter 102 is performed. At this time, the noise level is also amplified by signal amplification. However, noise reduction is performed subsequently and, therefore, the signal to noise ratio of the output image is improved by an amount corresponding to amplification of the color signal level.

Meanwhile, the edge gray level differences in the output image can be preserved by detecting edges from an infrared light image with a large amount of information and weakly and locally applying noise reduction processing to the edges. However, the signal to noise ratio at each edge may not be enhanced. Rather, the signal to noise ratio may deteriorate. Therefore, a detailed image of edge portions is extracted by the high-pass filter 103 and combined with the base image by the image synthesizer portion 104. Consequently, the signal to noise ratio of the whole image can be enhanced.

Because of the features described above, if the image-processing portion 100 described in patent reference 1 is used, a camera device can be accomplished which is capable of producing a bright output image that retains edge information and has high signal-to-noise ratio over the whole frame of image even if the subject is dark, by accepting light up to the infrared wavelength region.

Where processing is performed by the image-processing portion 100 shown in FIG. 13 using the visible light images of R, G, and B and an infrared light image made of A image as mentioned previously, components (especially, a large proportion of near-infrared light) other than the visible light are contained in the A image (infrared light image) but the ratio of the near-infrared light components to the A image varies greatly according to a different light source. For example, even under the same sunlight conditions, the ratio of the contained near-infrared light especially varies among at daybreak, in the daytime, and in the evening. Furthermore, even under indoor illumination, if the color temperature of the light source varies, the portion of the contained near-infrared light varies. For example, an electric bulb contains a much larger portion of near-infrared light than a fluorescent lamp.

FIG. 14 is a graph comparing an electric bulb, or a light source, having a color temperature of 3,000 K with a fluorescent lamp, or a different light source, in terms of spectral characteristics.

Where the electric bulb is a light source, it contains a large proportion of infrared light components as shown. Therefore, even where the frame of image is dark and the amount of information of visible light images of R, G, and B is small, the amount of information of the A image is relatively large. Additionally, the S/N of the A image is relatively high. Consequently, noise reduction can be done effectively on visible light images of R, G, and B while retaining edge information if the A image is used as a reference image for edge detection in cases where the frame of image is dark, as well as where the frame of image is bright.

On the other hand, where a fluorescent lamp is used as a light source, the light from the fluorescent lamp contains almost no infrared light components as shown. Even in this case, if the image on the display screen is bright, an A image acting as a reference image for edge detection typically has a required amount of information.

However, if the image on the display screen becomes darker, the A image does not offer the amount of information necessary for edge detection. Therefore, noise reduction on R, G, and B images may not be performed while retaining edge information. Furthermore, if the image is dark, a large gain can be secured for images of R, G, and B and so the noise levels in the images of R, G, and B are extremely large after the gain has been increased. These large levels of noise are attenuated to some extent in the noise reduction portion (in FIG. 13, the low-pass filter 102) but are not removed fully. The S/N obtained after the noise reduction is relatively low. As a result, a noisy image is outputted even after the noise reduction is carried out.

In order to circumvent these disadvantages, it is desired to increase the gain to make the image on the display screen brighter after noise reduction without forcibly increasing the gain ahead of the noise reduction portion.

Where it is desired that the gain be not increased forcibly before noise reduction is performed in this way, there is the possibility that the image is made noisy according to whether the indoor light source is a fluorescent lamp or an electric bulb. Furthermore, the image may be made noisy according to different outdoor shooting conditions such as different times and different weather conditions. In addition, the image may be made noisy according to different spectral characteristics of the light source such as according to whether the shooting is done outdoors or indoors. Moreover, the image may be made noisy by factors other than the light source such as differences in infrared absorption characteristics of the subject.

In this way, the image-processing portion for reducing noise as shown in the above-cited patent reference 1 and a camera device using the image-processing portion produce differences in ability to reduce noise according to the ratio of infrared light components. As a result, a noisy image is sometimes outputted. There remains room for improvement in this respect.

A video input processor according to one embodiment of the present invention has an imaging signal-generating portion, a gain adjustment portion, and a noise reduction portion.

The imaging signal-generating portion images a subject and produces first imaging signals containing visible light components and a second imaging signal containing near-infrared light components. In some cases, the imaging signal-generating portion is an imaging device. In other cases, the imaging signal-generating portion includes an imaging device and a signal-processing portion. The first and second imaging signals are sent from the imaging signal-generating portion to the gain adjustment portion.

The gain adjustment portion receives the first and second imaging signals. The gain adjustment portion adjustably sets a maximum gain value according to a relative magnitude between the visible light components and the near-infrared light components. The gain adjustment portion adjusts the gain for the first imaging signals at the set maximum gain value. After the adjustment of the gain, the first imaging signals are sent from the gain adjustment portion to the noise reduction portion.

The noise reduction portion receives the first imaging signals and reduces noises in the first imaging signals for each color while retaining edge information at image locations recognized based on the edge information.

An imaging signal-processing circuit according to one embodiment of the invention is an imaging signal-processing circuit which receives first imaging signals containing visible light components and a second imaging signal containing near-infrared light components. The imaging signal-processing circuit reduces noises in the first imaging signals. The imaging signal-processing circuit has a gain adjustment portion and a noise reduction portion. The gain adjustment portion is similar in functions with the aforementioned video input processor.

A method of reducing noises in imaging signals in accordance with one embodiment of the present invention starts with obtaining first imaging signals containing visible light components and a second imaging signal containing near-infrared light components. A maximum gain value is adjustably set according to a relative magnitude between the visible light components and the near-infrared light components. A gain adjustment is made for the first imaging signals at the set maximum gain value. After the gain adjustment, noises in the first imaging signals are reduced.

In the embodiments of the present invention, the second imaging signal preferably contains visible light components equivalent to the visible light components of the first imaging signals and near-infrared light components corresponding to the amount of near-infrared light from the subject. Based on the first and second imaging signals from the imaging signal-generating portion, the gain adjustment portion calculates a parameter regarding a relative magnitude between a first comparative value obtained from the visible light components of the first imaging signals and a second comparative value. The second comparative value is obtained by adding near-infrared light components corresponding to the visible light components of the second imaging signal to the visible light components of the second imaging signal equivalent to the first comparative value. The gain adjustment portion adjustably sets the maximum gain value, based on the magnitude of the parameter.

Furthermore, in the embodiments of the present invention, the imaging signal-processing circuit preferably further includes an edge information acquisition portion configured to acquire edge information from the second imaging signal. The noise reduction portion reduces noises in the first imaging signals for each color while retaining edge information at image locations recognized based on the edge information.

In the configuration of the embodiments of the present invention described above, when the gain is adjusted for the first imaging signals, the maximum gain value is set, based on the first and second imaging signals. More specifically, the parameter regarding the relative magnitude between the first and second comparative values is calculated. The first comparative value is obtained from the visible light components of the first imaging signal and associated with the magnitude of the visible light components. The second comparative value is associated with a value obtained by adding near-infrared light components corresponding to the visible light components of the second imaging signal to the visible light components of the second imaging signal equivalent to the first comparative value.

Increasing the value of this parameter K means that one of the first and second comparative values is set greater than the other. Conversely, reducing the value of the parameter means that one of the first and second comparative values is set smaller than the other.

In the embodiments of the present invention, during gain adjustment made before noise reduction, whether the near-infrared light components contained in the second imaging signal are large or small is determined, for example, according to the magnitude of the parameter. According to the magnitude of the parameter, the maximum gain value is set or restricted during the gain adjustment. In the embodiments of the invention, the maximum gain value can be varied to different values according to the parameter.

Usually, there is a limitation in noise reduction according to the input dynamic range. If the limitation is exceeded, noise in the output image increases rapidly. The limitation is varied by the magnitude of the noise level, as well as by the input signal level. As the gain for signal is increased in the signal-processing path from imaging to noise reduction, the level of noise contained in the signal is increased. However, noise produced in an imaging device is often suppressed to somewhat extent by signal processing performed inside the device. Therefore, noise produced in an amplifier existing between the imaging device and the noise reduction stage mainly dominates the noise level that determines the aforementioned limitation in noise reduction.

That is, the limitation in reduction of noise level beyond which the noise level increases rapidly is associated with the signal level produced before noise reduction is actually performed and also with the gain used when an adjustment is made to the signal level.

In the above-described video input processor according to one embodiment of the invention, the imaging signal-generating portion is designed to be capable of generating the first imaging signals containing visible light components and the second imaging signal containing near-infrared light components. If a relative magnitude between the near-infrared light components of the second imaging signal and the visible light components of the first imaging signals is known, the relative magnitude of the limitation of noise reduction beyond which the noise level will increase rapidly can be forecasted. The gain adjustment portion can calculate the relative magnitude between the light components, for example, as a parameter. Consequently, the maximum gain value can be adjustably set such that the limitation of the noise reduction capability is not exceeded.

Because of the configuration described so far, if environmental variations take place such as when a different light source is used to image a subject or the color temperature of the light source varies, the noise-reducing capability is prevented from being impaired during the processing for lowering the gain. Consequently, the noise-reducing capabilities assure that a high-quality image is outputted at all times.

The embodiments of the present invention can effectively eliminate the disadvantages that the noise-reducing capability is varied according to the proportion of contained infrared light components and that the noise-reducing capability is sometimes exceeded; otherwise, a noisy image would be outputted.

BRIEF DESCRIPTION OF THE DRAWINGS

FIG. 9 is a diagram conceptually illustrating the relationship between edge decision and filtering;

FIG. 10 is a diagram conceptually illustrating the relationship between setting of filter coefficients and filtering;

FIG. 11 is a flowchart particularly illustrating gain adjustment;

FIG. 12 is a schematic diagram of parts of a camera configuration associated with a modification of the present invention;

DESCRIPTION OF THE PREFERRED EMBODIMENTS

Embodiments of the present invention are hereinafter described with reference to the drawings.

First Embodiment

Figure 1:
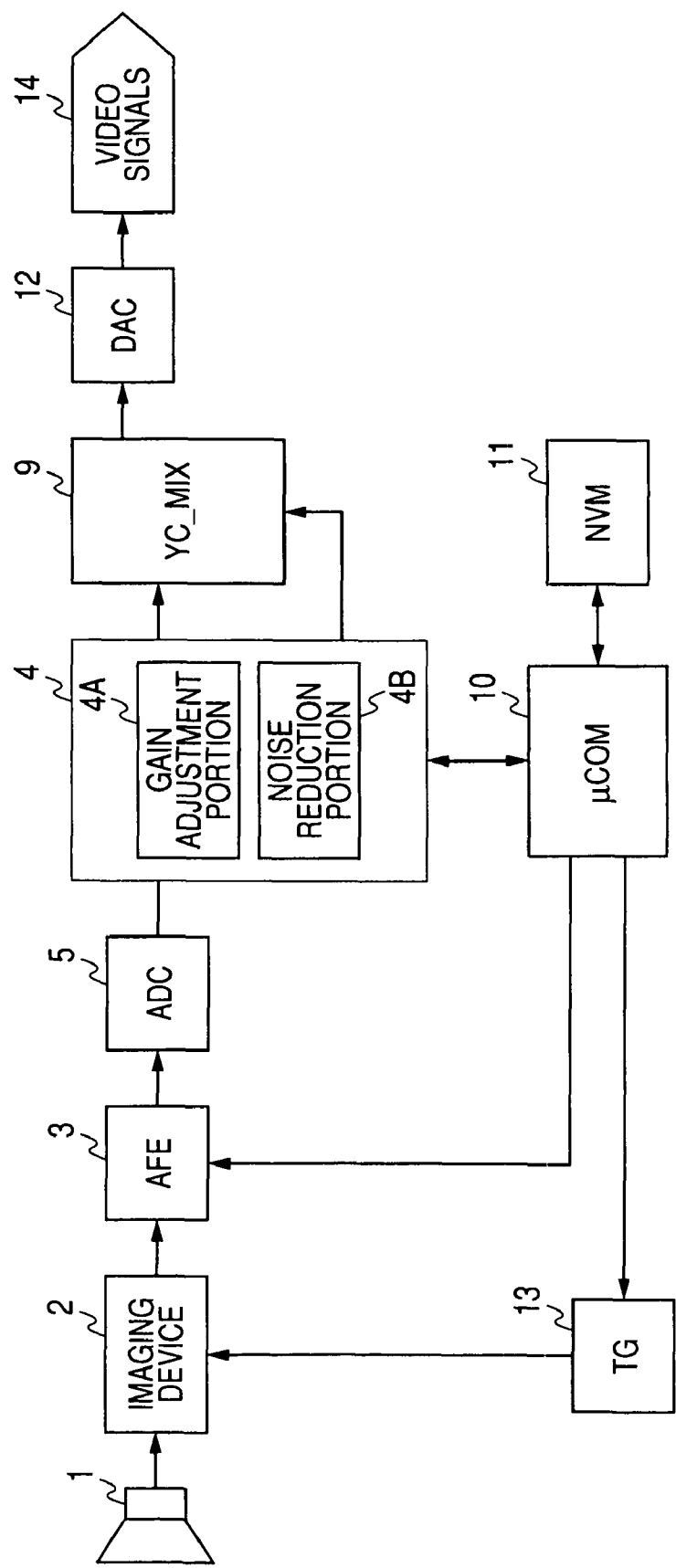
FIG. 1 is a block diagram of a camera device incorporating an imaging signal-processing circuit according to one embodiment of the present invention.

FIG. 1 is a block diagram of a camera device incorporating an imaging signal-processing circuit associated with the present embodiment of the invention. The camera device corresponds to one form of the "video input processor" of the invention. The camera device can be either a video camera chiefly designed to take motion picture sequences or a digital still camera chiefly designed to take still images.

The illustrated camera device has optical components 1 including lenses and an optical filter, an imaging device 2, an analog front-end (AFE) circuit 3 for processing an analog imaging signal, an analog-to-digital converter (ADC) 5 for converting the analog imaging signal into a digital signal and outputting the digital signal to various signal-processing portions as a digital video signal, and a digital-to-analog converter (DAC) 12 for converting video signals processed variously into analog signals and outputting the analog signals as video signals 14.

The optical filter included in the optical components 1 block high-frequency components higher than the Nyquist frequency, for example, to prevent aliasing distortion. The optical filter may or may not incorporate the function of an infrared cut filter. Where the optical filter does not have the function of an infrared cut filter, the function of the infrared cut filter is possessed by an on-chip multilayer filter of the imaging device 2.

Figure 2:
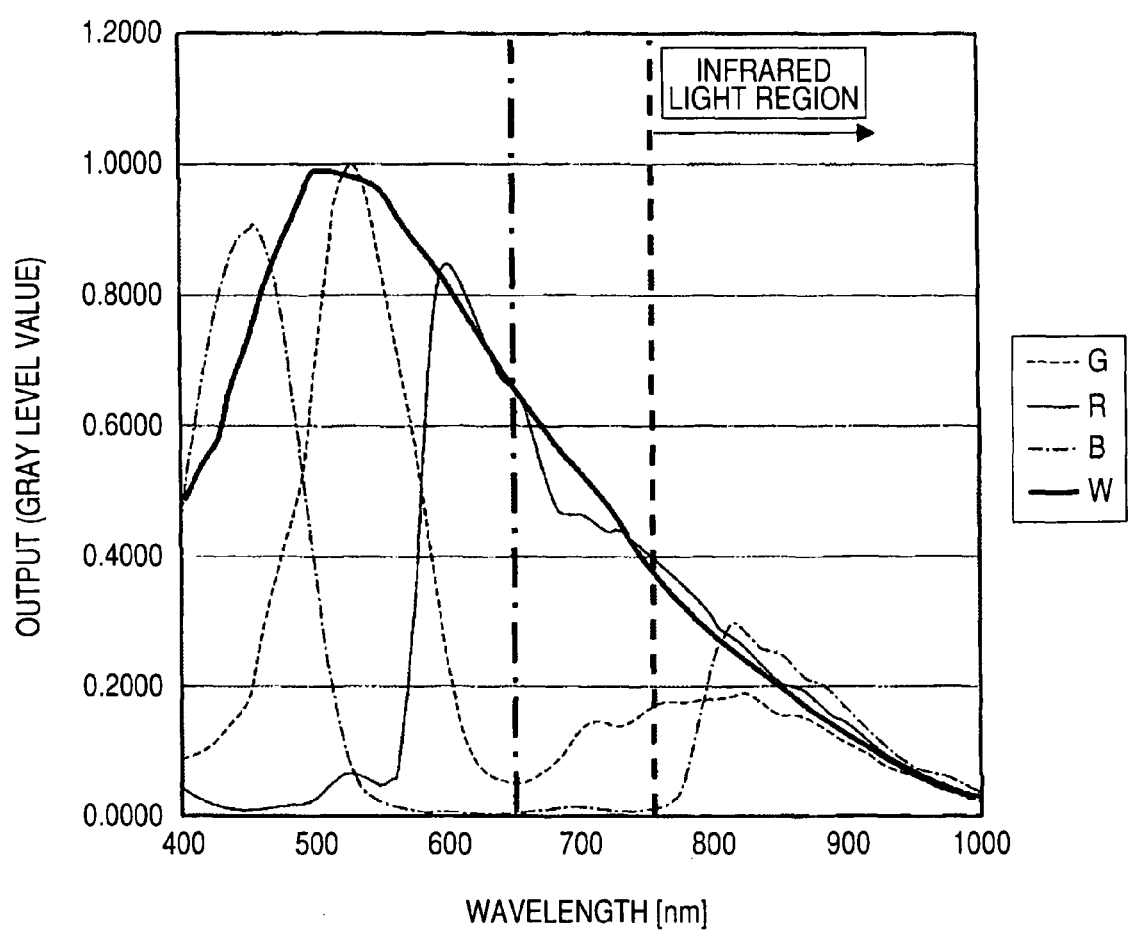
FIG. 2 is a graph showing the output spectral characteristics of the imaging device shown in FIG. 1, illustrating this embodiment.

FIG. 2 shows the output spectral characteristics of the imaging device used in the present embodiment, the imaging device having the on-chip multilayer filter. In the graph of FIG. 2, the wavelength of incident light is plotted on the horizontal axis, while the gray level of the output level of an imaging signal of each color is plotted on the vertical axis. The output level is represented, for example, by 8 bits. That is, the gray level can assume values from 0 to 1,024.

It can be seen from FIG. 2 that this imaging device has sensitivity to red (R), green (G), blue (B), and white (W) radiation at frequencies higher than the lower limit (700 to 800 nm; 750 nm in the illustrated example) of the near-infrared region.

The illustrated camera device has a signal-processing portion 4 for processing the digital signal from the analog-to-digital converter (ADC) 5. The signal-processing portion 4 is one form of the "imaging signal-processing circuit" of the present invention and includes a gain adjustment portion 4A and a noise reduction portion 4B.

The signal-processing portion 4 is offered as a semiconductor chip in the form of an IC, a module in which plural parts are mounted, or a substrate on which parts are mounted. The signal-processing portion 4 can be incorporated in the camera device. The signal-processing portion 4 is connected between the analog-to-digital converter 5 and the digital-to-analog converter 12 and performs the various kinds of processing including signal amplification (i.e., preprocessing), noise reduction (NR), separation into luminance and color signals, processing of the luminance signal, and processing of the color signals.

A mixer circuit (YC_MIX) 9 for combining the luminance and color signals obtained by the aforementioned separation is connected between the signal-processing portion 4 and the digital-to-analog converter 12. The signal-processing portion 4 may also include the mixer circuit 9. The signal-processing portion 4 may be made of an IC or module.

Figure 3A:
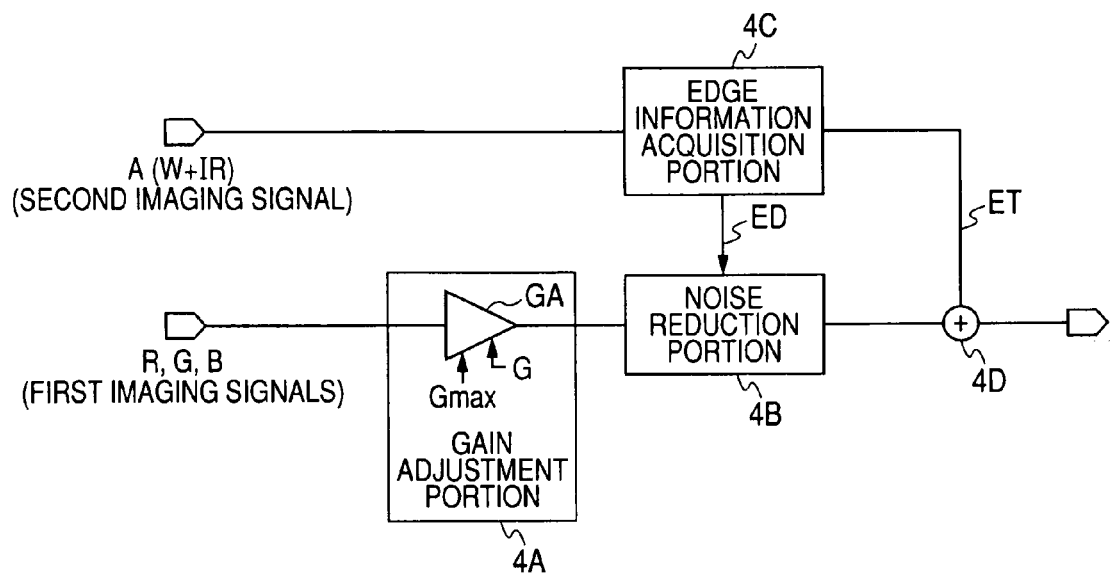
FIG. 3A is a block diagram of a noise reduction portion included in the imaging signal-processing circuit shown in FIG. 1.

FIG. 3A shows an example of configuration of a part (noise reduction portion) of the signal-processing portion 4 including the gain adjustment portion 4A and noise reduction portion 4B shown in FIG. 1. The gain adjustment portion 4A and noise reduction portion 4B are characteristic portions of the present embodiment. The illustrated noise reduction processing portion 54A receives first imaging signals and a second imaging signal separately. The first imaging signals contain visible light components. The second imaging signal contains near-infrared light components.

Imaging signals of the primary colors are taken as an example herein. The first imaging signals are imaging signals for pixels of red (R), green (G), and blue (B) colors (hereinafter may be abbreviated the R signal, G signal and B signal), respectively. The second imaging signal contains a white imaging signal (hereinafter may be abbreviated the W signal) that is a visible light component equivalent to the visible light components (R signal+G signal+B signal) of the first imaging signals and an imaging signal of near-infrared light (hereinafter may be abbreviated the IR signal) components. The second imaging signal (A signal or A pixel signal) is shown to be the sum of the W signal and IR signal herein.

The IR signal contains almost all the near-infrared light components of the light emanating from the subject. That is, neither the optical components 1 nor the imaging device 2 shown in FIG. 1 has any IR cut filter at least in the route for receiving the IR signal. Therefore, except for slight losses, the IR signal contains almost all the near-infrared light components from the subject.

As shown in FIG. 3A, the noise reduction processing portion 54A has the gain adjustment portion 4A, the noise reduction portion 4B, and an edge information acquisition portion 4C. The gain adjustment portion 4A includes at least a variable gain amplifier GA, which amplifies or attenuates the R, G, B signals according to a given gain value. This is referred to as gain adjustment herein. The gain adjustment portion 4A has a function of adjustably setting a maximum gain value $G_{max}$ of the gain amplifier GA. This function will be described in detail later.

The edge information acquisition portion 4C obtains edge information ED (such as differential pixel values between adjacent pixels) from the A pixel signal and outputs the edge information to the noise reduction portion 4B.

The noise reduction portion 4B performs processing for noise reduction on the R, G, B signals after the gain adjustment. At this time, the noise reduction portion 4B performs the processing for noise reduction at other than the edges while holding edge gray level differences at image locations (edge portions) recognized based on the obtained edge information ED. To hold the edge gray level differences, the noise reduction portion 4B hardly performs the processing for noise reduction at the edges or applies the noise reduction processing more weakly.

More preferably, the edge information acquisition portion 4C has a function of extracting local detailed information (edge texture information ET) about the edge portions from the A pixel signal. In order that the extracted edge texture information ET be reflected in the R, G, B signals, the noise reduction (NR) portion 54A incorporates a combining portion 4D for combining the edge texture information ET with the R, G, B signals undergone the processing for noise reduction.

Consequently, the image indicated by the output signal from the combining portion 4D is a high-quality image in which edge gray levels are preserved and noises are reduced. Furthermore, in the high-quality image, image quality deterioration at the edges is prevented.

In the present embodiment, all the configuration in the stage immediately preceding (located upstream in the direction in which signals are processed) the noise reduction processing portion 54A shown in FIG. 3A corresponds to one form of the "imaging signal-generating portion" of the present invention. That is, in FIG. 1, the configurations in the stages preceding the gain adjustment portion 4A within the signal-processing portion 4, i.e., the analog-to-digital converter 5, analog front-end (AFE) circuit 3, imaging device 2, and optical components 1, correspond to the "imaging signal-generating portion" of the present invention.

The optical components 1 have lenses and apertures received in a lens housing. The optical components 1 can provide focus control and aperture control for controlling the amount of exposure. The optical components 1 include an aperture-driving portion for exposure control, a driving portion for auto focus, and control circuits for the driving portions.

The imaging device 2 is a CCD sensor or a CMOS image sensor. The imaging device 2 is held inside the body of the camera device such that an optical image produced from the subject and impinging on the imaging device is focused via the optical components 1 onto the imaging surface of the imaging device. The imaging device 2 has a pixel array made of a matrix of a large number of optical sensors and a multilayer filter on the incident side of the imaging surface of the pixel array. The multilayer filter is an assemblage of several adjacent optical sensors (pixel units) forming a given array.

Where the imaging device 2 is a CCD sensor, a timing generator (TM) 13 is connected with the imaging device 2. The imaging device 2 can receive a clock signal, a vertical SYNC signal, and a horizontal SYNC signal from the timing generator 13. Where the imaging device 2 is a CCD, transfer pulses synchronized with the vertical SYNC signal and horizontal SYNC signal are also supplied from the timing generator 13.

The timing generator 13 is a circuit for producing a signal for controlling these timings from a system clock signal (not shown) under control of the microcomputer 10. With respect to the imaging device 2, various operations such as transfer operation and modification of the shutter speed are controlled by the signal for controlling the timings. Where the imaging device 2 is a CMOS sensor, the function of the timing generator 13 can be imparted into the imaging device 2.

The imaging device 2 is included in the "imaging signal-generating portion" of the present invention. Because the "imaging signal-generating portion" includes all the configurations in stages preceding the configuration shown in FIG. 3A, the imaging device or devices 2 can be one or two.

Where the imaging device 2 is singular in number, pixels for outputting color signals of the first imaging signals (such as R, G, B signals) and pixels for outputting the second imaging signal (such as A pixel signal) are contained in a given array within one pixel unit constituting a repeating unit. The array is determined by the structure of the multilayer filter in which the functions of color selection and IR cutting are all incorporated.

Where there are two separate imaging devices 2, one of them outputs the first imaging signals. The other imaging device outputs the second imaging signal. In this case, an optical image from the same subject is split into two parts along two directions by an optical component such as a dichroic prism. The two parts of the optical image are received by the two imaging devices disposed along the two directions.

Color selective filters are placed on the imaging device for producing the first imaging signals. An IR cut filter is mounted in the optical path between the imaging surface and the optical components. Alternatively, a multilayer filter having all the functions of an IR cut filter and color selective filters may be placed on the imaging device.

Meanwhile, on the imaging device for producing the second imaging signal, neither the color selective filters nor the IR cut filter is mounted. Thus, the imaging device can produce the A (=W+IR) signal.

Figures 4A, 4B:
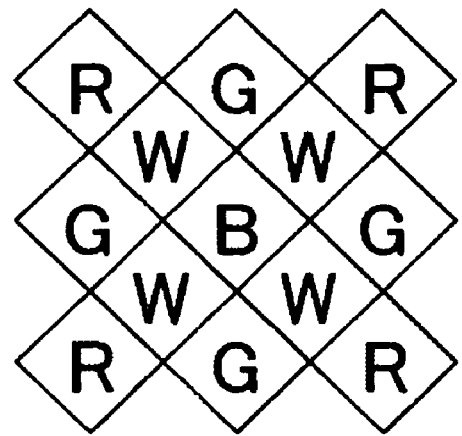
FIGS. 4A and 4B are diagrams each showing one pixel unit of the color array in a multilayer filter.

FIGS. 4A and 4B show two examples of a pixel unit having the color array of the multilayer filter of the imaging device 2. The color array is adapted for the case where there is a single imaging device. Where there are two imaging devices, a filter having a well-known "Bayer filter of the primary colors" or Knight color array may be used as one of the imaging devices.

The type of color array is not limited to these two examples. A typical example of primary-color filter is now described. Where color filters are primary-color filters, an array other than the illustrated array can be adopted. Alternatively, as already proposed variously, a color filter may be a complementary color filter in which arbitrarily selected plural complementary colors are arranged regularly.

Each color selective layer of the multilayer filter has a color array, for example, as shown in FIG. 4A or 4B.

The color array shown in FIG. 4A is known as "W checker". The color array shown in FIG. 4B is known as "W zigzag checker". Each of the "W checker" and "W zigzag checker" contains white (W) pixels having sensitivity to a wavelength region that covers all the detected wavelength regions of G, R, and B pixels. The W pixels are arranged in a checker pattern.

Meanwhile, the IR cut layer of the multilayer filter is designed to cut infrared radiation at G, R, and B pixels and to transmit infrared radiation at W pixels.

Generally, near-infrared radiation has wavelengths of from 0.7 to 0.8 μm (longer wavelength limit of the visible red light) to 2.5 μm (or 1.5 to 3 μm). Since near-infrared light components have the problem that they make the color whitish, it may be necessary to remove the near-infrared light components from the first imaging signals (R, G, B signals). However, it is difficult to completely block the near-infrared light components by the IR cut filter. Normally, the output spectral characteristics of an imaging device have sensitivity to red (R), green (G), blue (B), and white (W) even in the near-infrared region as shown in FIG. 2. The human visual sensation has almost no sensitivity to wavelengths longer than a wavelength slightly shorter than 700 nm. Therefore, the imaging device 2 having the illustrated output spectral characteristics is so designed that the IR cut layer (or IR cut filter) suppresses wavelengths longer than, for example, about 650 nm indicated by the bold dot-and-dash line.

Referring back to FIG. 1, the AFE circuit 3 to which the analog imaging signal from the imaging device 2 is inputted performs some kinds of processing on the analog signal, e.g., removal of reset noises, for example, due to correlated double sampling (in the case of a CCD), other noise removal, and amplification.

The analog-to-digital converter (ADC) 5 converts the processed analog signal into a digital signal of given bits (e.g., 8 bits or 10 bits). The digital signal contains a pixel signal sequence having gray level values of the given bits for each pixel. That is, the digital signal outputted from the analog-to-digital converter 5 contains a pixel signal sequence in which A pixels alternate with pixels of other colors.

The noise reduction processing portion 54A of the configuration as already described in connection with FIG. 3A is included in the signal-processing portion 4. In the case of a single plate type, the imaging device 2 delivers pixel signals of red (R), green (G), blue (B), and All (A=W+IR) as a time-sequential serial signal in the scanning order when an image is displayed. The configuration for separating the first imaging signals (for example, R, G, and B signals) and the second imaging signal (for example, A pixel signal) from the serial signal may need to be placed ahead of the noise reduction processing portion 54A within the signal-processing portion 4.

The noise reduction portion 4B receives each color of the separated first imaging signals (R, G, B signals) and reduces noise for each color and each pixel. As described in detail later, when the pixel signals constituting the R, G, and B signals are processed, the processing is repeated while sequentially modifying the target pixel to be processed. If it is determined based on the edge information obtained by the edge information acquisition portion 4C that there are no edges at each target pixel or its surroundings, the noise reduction portion 4B performs noise reduction. If it is determined that there are edges at each target pixel and its surroundings, noise reduction is not effectively performed.

This processing can be carried out by a low-pass filter. Where edge gray level differences should be especially preserved, an edge-preserving filter such as a cross bilateral filter is used. The cross bilateral filter is described in detail in the following second embodiment.

The R, G, and B signals obtained after noise reduction are each separated into a luminance signal and color signals.

After each isolated signal is processed in a given manner, the signal is outputted from the signal-processing portion 4.

The mixer circuit 9 combines the luminance and color signals processed by the signal-processing portion 4 and produces video signals.

The digital-to-analog converter (DAC) 12 is a circuit for converting the video signals into analog video signals 14 and outputting them.

The microcomputer 10 is a circuit for controlling the imaging device 2, AFE circuit 3, signal-processing portion 4, timing generator (TG) 13, and all the other components. A rewritable memory for holding control parameters (such as a nonvolatile memory (NVM) 11) is connected with the microcomputer 10. A monitor display portion, a circuit for encoding the video signals 14 and outputting the encoded signals to the monitor display portion, and a circuit for processing and outputting audio signals are not shown in FIG. 1.

Second Embodiment

A more detailed embodiment including the noise reduction processing portion 54A that is one feature of the embodiment is described below. It is assumed here that the camera device has the imaging device 2 of the single panel type.
[Configuration of Signal-Processing Portion]

Figure 5:
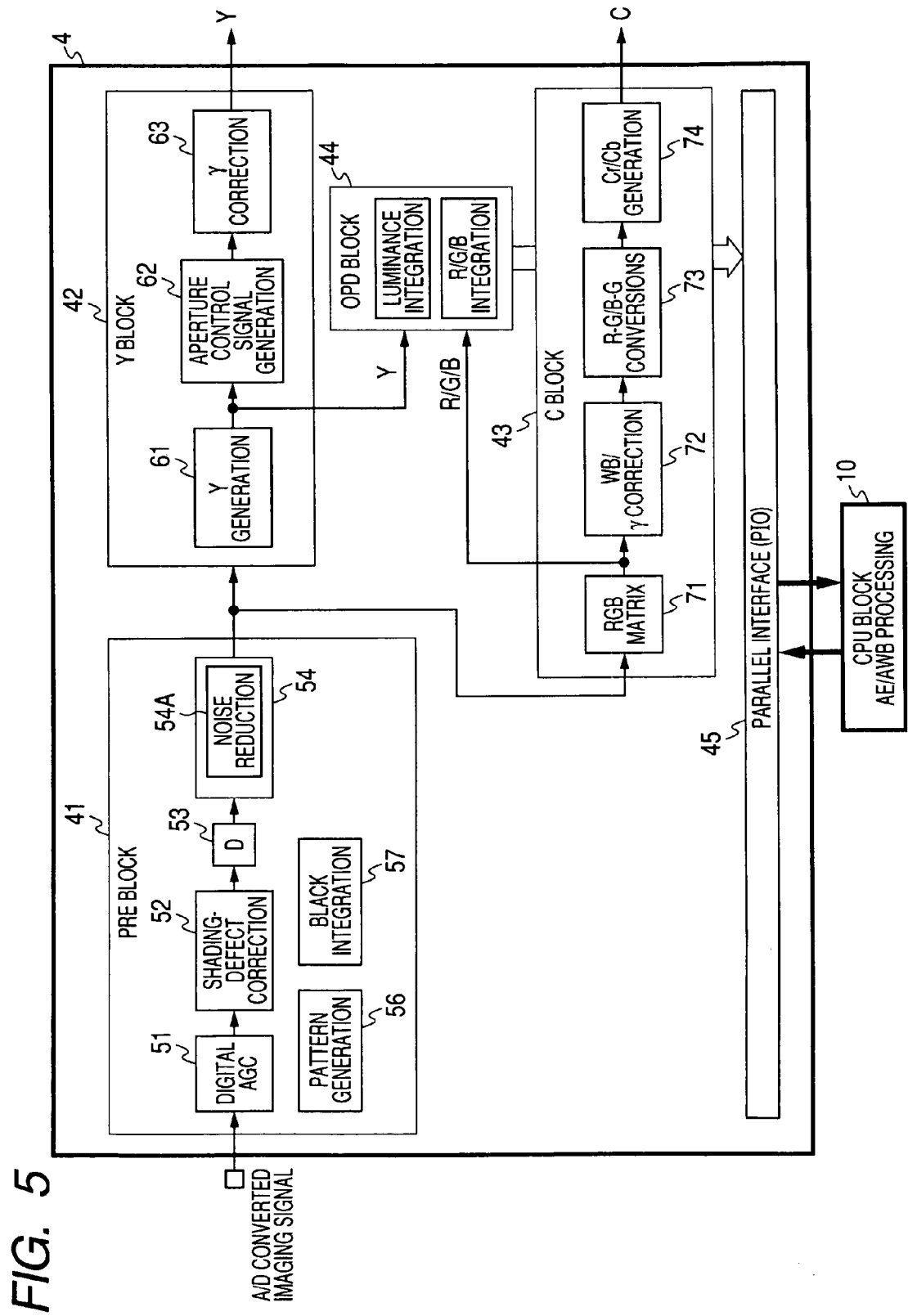
FIG. 5 is a block diagram of a signal-processing portion.

FIG. 5 is a block diagram showing one example of configuration of the signal-processing portion 4. The illustrated signal-processing portion 4 is made up of some major blocks, i.e., a PRE block 41 for performing preprocessing, a Y block 42 for extracting and processing the luminance signal (Y), a C block 43 for extracting and processing the color signal (C), and an OPD (optical detector) block 44 for detecting the brightness of the image on the display screen. Each block is connected with the microcomputer 10 (CPU block in FIG. 5) via a parallel interface (PIO) 45. The blocks are under control of the microcomputer 10. Thus, processing in the PRE block, automatic exposure (AE), automatic white balance adjustment (AWB), and other processing are performed.

The PRE block 41 has a digital automatic gain control (AGC) circuit 51, a shading-defect correcting circuit 52, a delay line portion (D) 53, a noise reduction (NR) block 54, a pattern generation circuit 56, and a black integration circuit 57.

The AGC circuit 51 adjusts the gain for the input digital imaging signal. Usually, the AGC circuit 51 is mounted to obtain a signal amplitude adapted for processing performed in later stages. The whole of the single imaging signal is uniformly amplified. That is, visible light components and near-infrared light-components are uniformly amplified.

In the present embodiment, the noise reduction block 54 includes a gain-adjusting portion and so signal amplitudes necessary for the Y block 42 and C block 43 are obtained. Therefore, the AGC circuit 51 can be omitted unless the input amplitude to the stage preceding the noise reduction block 54, i.e., shading defect-correcting circuit 52, is too small that necessary processing accuracy is not obtained or unless other special circumstance takes place.

The shading-defect correcting circuit 52 performs a shading correction for correcting differences in brightness caused by difference in light-receiving position between the center and marginal portions in the light-receiving face of the sensor (imaging device 2). Furthermore, the correcting circuit 52 compensates for data dropouts in the imaging signal from the imaging device 2.

The delay line portion 53 is a circuit for delaying the signal by an amount corresponding to several lines of video signal standards (horizontal pixel signal sequence) having a given number of pixels in the horizontal and vertical directions for processing in the noise reduction block 54. For example, where a delay corresponding to 5 lines is necessary for processing in the noise reduction block 54, four 1-line delay portions can be connected in series. A pixel signal sequence corresponding to 5 lines can be applied to the noise reduction block 54 in parallel from the outputs from the 1-line delay portions and from the output of a non-delay line (line that outputs the input as it is).

Instead of the delay line portion 53, an image memory may be mounted. Data typically corresponding to a required number of lines may be readout. The configuration and operation of the noise reduction block 54 will be described in detail later.

The imaging device 2 shown in FIG. 1 is of the single panel type, and the color array shown in FIG. 4A or 4B is adopted. Therefore, with respect to individual colors represented by the imaging signals outputted from the imaging device 2, a pixel signal having information about any one of red (R), green (G), and blue (B) and a pixel signal of white (W) are alternately mixed on the time axis. Accordingly, an image represented by the imaging signals is in a mosaic pattern for each color. An image having such a mosaic color array is referred to as a "mosaic image".

If such a mosaic image is intact used in noise reduction processing, the processing may not be performed accurately because there are information dropouts. Accordingly, the noise reduction block 54 has a function of demosaicking the mosaic image. "Demosaicking" of a mosaic image of a certain color is processing for producing color information in a portion where there is no information about the specific color by interpolation from adjacent pixels having information about the specific color and thus the mosaic image is converted into a "demosaicked image" having color information in all corresponding pixel portions. Detailed configurations for demosaicking are not shown. Generally, a circuit configuration for a simple linear interpolation or a high accurate interpolation using repetition of color estimation and combination is adopted.

The pattern generation circuit 56 produces a test pattern under circumstances where the image device 2 is not connected. The black integration circuit 57 detects the black level of the digital imaging signal.

The Y block 42 receives and processes the demosaicked imaging signal of A pixels having the largest amount of information among the demosaicked imaging signals outputted from the PRE block 41. The Y block 42 has a Y-generating portion 61 for producing a luminance signal (Y) from the demosaicked imaging signal from A pixels, an aperture control signal-generating portion 62 for producing an aperture control signal from the luminance signal (Y), and a gamma ($\gamma$) correction portion 63 for gamma-correcting the aperture control signal.

The luminance signal (Y) produced by the Y-generating portion 61 is fed to the OPD block 44. The aperture control signal-generating portion 62 modifies the luminance signal (Y) produced from the Y-generating portion 61 such that only image contours are emphasized. The modified luminance signal (Y) is supplied to the gamma correction portion 63. The gamma correction portion 63 outputs the gamma-corrected luminance signal (Y) to the mixer circuit 9 of FIG. 1.

The C block 43 receives and processes the demosaicked imaging signals of R, G, and B pixels. The C block 43 has an RGB matrix circuit 71, a white balance adjustment (WB) and gamma ($\gamma$) correction circuit 72, a color-difference converting circuit 73 for converting color-difference signals (R-G) and (B-G), and a chroma-generating circuit 74 for producing chroma signals Cr and Cb.

The RGB matrix circuit 71 receives the demosaicked imaging signals of R, G, and B pixels and outputs color signals (R, G, and B signals) synchronized for each pixel unit. The R, G, and B signals are outputted to the OPD block 44 and to the WB-and-$\gamma$ correction circuit 72.

The WB-and-$\gamma$ correction circuit 72 achieves gain balance for each color from the input R, G, and B signals, and makes a white balance adjustment (WB). At this time, the brightness information from the OPD block 44 is referenced. The pixel intensities of the white balanced R, G, and B signals are subjected to a color gamma ($\gamma$) correction. To represent the response characteristics of the gray levels in the image, a numerical value, known as gamma ($\gamma$), is used at this time. This numerical value is held, for example, in the nonvolatile memory 11 shown in FIG. 1 or in the storage region of the microcomputer 10. The value is supplied to the WB-and-$\gamma$ correction circuit 72 via the PIO 45 of FIG. 5. Gamma correction is processing for correctly displaying the brightness and the color saturations of the displayed image.

The color-difference converting circuit 73 converts the gamma-corrected R, G, and B signals into color-difference signals (R-G) and (B-G). The chroma-generating circuit 74 produces chroma signals Cr and Cb from the output signals from the color-difference converting circuit 73. The produced chroma signals Cr and Cb are sent to the mixer circuit 9 shown in FIG. 1.

The OPD block 44 includes a luminance integration circuit 44A for producing an integrated luminance value used, for example, for automatic exposure control (AE) and an RGB integration circuit 44B for producing integrated R, G, and B values for the individual colors used, for example, for a white balance adjustment.

The luminance integration circuit 44A produces an integrated luminance value by integrating the luminance signal (Y), for example, over one frame of image. The integrated luminance value is supplied to the aperture control circuit mounted in the optical components 1 of FIG. 1 and to the analog gain circuit incorporated in the imaging device 2 via the microcomputer 10.

The RGB integration circuit 44B produces integrated R, G, and B values by integrating the R, G, B signals for the individual colors from the RGB matrix circuit 71, for example, over one frame of image for each color. The integrated R, G, and B values are supplied via the PIO 45 to the microcomputer 10, where the WB gain is calculated. The result is supplied to the WB-and-$\gamma$ correction circuit 72.

These integration circuits may be replaced by various accumulation portions (described later) mounted in the noise reduction block 54. In this case, the OPD block 44 can be omitted.

[Details of Noise-Reduction Block]

Figure 6:
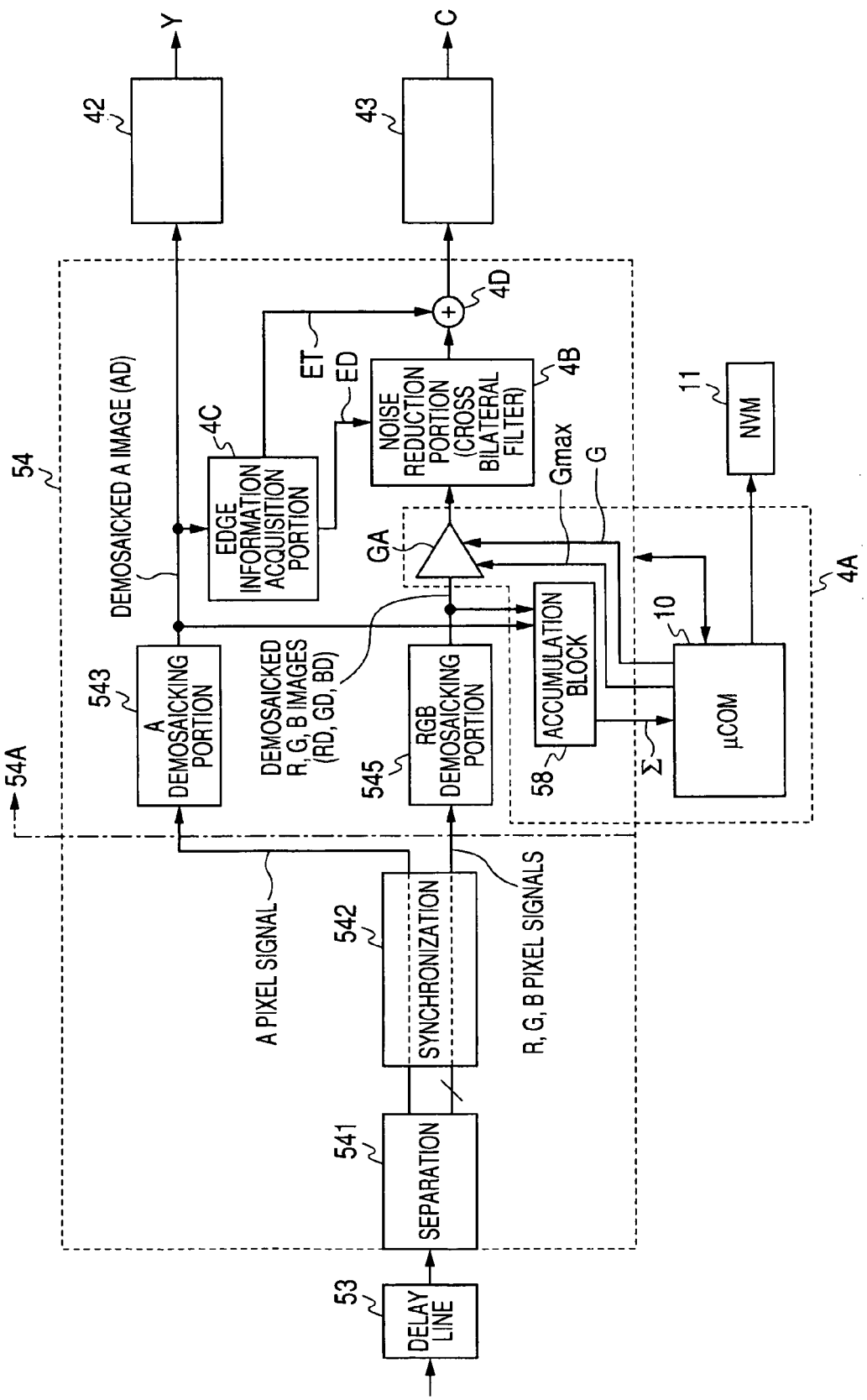
FIG. 6 is a block diagram showing the details of a noise reduction block.

FIG. 6 is a more detailed block diagram of the noise reduction block 54. The illustrated noise reduction block 54 includes a separation portion 541, a synchronizing portion 542, an A demosaicking portion 543, an RGB demosaicking portion 545, a gain adjustment portion 4A, a noise reduction portion 4B, an edge information acquisition portion 4C, and the combining portion 4D. Of these portions, the A demosaicking portion 543, RGB demosaicking portion 545, gain adjustment portion 4A, noise reduction portion 4B, edge information acquisition portion 4C, and combining portion 4D are included in the noise reduction processing portion 54A shown in FIG. 3A.

The separation portion 541 separates the A pixel signal constituting a mosaic image of A (W+IR) pixels from R, G, and B pixel signals of the other colors. The synchronizing circuit 542 receives the separated A pixel signal, R, G, and B pixel signals, synchronizing them, and outputting them. The A pixel signal is applied to the A demosaicking portion 543. The R, G, and B pixel signals are applied to the gain adjustment portion 4A.

The A demosaicking portion 543 demosaicks the input A pixel signal and produces a demosaicked A image. Similarly, the RGB demosaicking portion 545 demosaicks the input R, G, and B pixel signals and produces demosaicked R, G, and B images.

These demosaicking steps may be simple demosaicking such as linear interpolation. More desirably, the demosaicking may be performed, for example, by a circuit capable of repeating color estimation and combination, the circuit being used for high accurate interpolation. More specifically, the demosaicking may be implemented by means of a circuit dedicated for interpolation, a computer-based controller such as a DSP (digital signal processor) and the functions of a program for operating the controller.

The edge information acquisition portion 4C acquires edge information ED from the demosaicked A image by a given technique. At this time, the edge information acquisition portion 4C acquires edge information from a range of adjacent pixels centered at the target pixel. For example, the range of adjacent pixels is defined by an arbitrary number of pixels in the horizontal and vertical directions such as 3×3 or 5×5 pixels. Usually, the horizontal and vertical dimensions of the range are made of the same odd number of pixels. The target pixel is subjected to noise reduction using filtering performed by the noise reduction portion 4B. The target pixel sequentially varies in the input order, e.g., in one sense of the horizontal direction of the video signal. The edge information acquisition portion 4C again recognizes the range of adjacent pixels such that the modified target pixel becomes the center whenever the target pixel is shifted to the adjacent pixel position. Thus, the edge information acquisition portion 4C repeats acquisition of edge information. The acquired edge information ED is supplied from the edge information acquisition portion 4C to the noise reduction portion 4B.

A specific technique of acquiring edge information is to find the difference in pixel value between the target pixel and other pixel within the range of adjacent pixels centered at the target pixel.

In the present embodiment, the noise reduction portion 4B is made of a cross bilateral filter. The filter configuration is fundamentally a well-known two-dimensional low-pass filter (LPF). For example, the LPF configuration shown in patent reference 1 can be adopted.

At this time, edges are judged from the acquired edge information ED. The filter coefficients are modified such that more edge gray level differences are preserved based on the result of the judgement on the edges. At this time, it is also possible to emphasize the original edge gray level differences. The modified filter coefficients are applied to the two-dimensional filtering of the R, G, and B images.

In this way, edges are judged from the edge information ED about the demosaicked image made up of A pixels. The R, G, and B images are processed by the two-dimensional filter, using the result of the judgement on the edges. Consequently, edge gray level differences corresponding to the pixel value differences can be preserved with more desirable results. A two-dimensional filter that references image information different from the filtered subject is especially referred to as a cross bilateral filter. Processing performed by the cross bilateral filter will be described briefly later. Because edge detection (i.e., acquisition of edge information and judgment of edges) is performed using a demosaicked A image, the edges can be detected accurately. As a result, the edge information can be effectively preserved at the output from the cross bilateral filter. The processed R, G, and B pixel signals are outputted to the combining portion 4D.

The edge information acquisition portion 4C has a function of extracting edge texture information ET from the A pixel signal (strictly speaking, demosaicked A pixel signal). The range of extraction may be obtained, for example, by merging all adjacent pixel regions which are judged to be edges and contain pixel value differences into one by ANDing. The edge texture information ET is outputted from the edge information acquisition portion 4C to the combining portion 4D.

The combining portion 4D replaces information about the edge portions contained in the R, G, and B pixel signals entered from the noise reduction portion 4B by the edge texture information ET entered from the edge information acquisition portion 4C, thus combining images (i.e., mixing of signals).

The R, G, and B images from the combining portion 4D are sent to the C block 43 for processing of the color signals. The demosaicked A image AD from the A demosaicking portion 543 is sent to the Y block 42 for processing of the luminance signal.

[Details of Gain Adjustment Portion and its Operation]

The gain adjustment portion 4A that is a characteristic portion of the present embodiment includes a gain amplifier GA and an accumulation block 58. The gain amplifier GA receives the demosaicked R, G, and B images from the RGB demosaicking portion 545, and multiplies the R, G, and B pixel signals of the colors forming the demosaicked R, G, and B images by a gain value G, thus varying the signal amplitudes uniformly. The gain value may be varied among the colors. In the present embodiment, the same gain value G is used, because a circuit for color balance correction is present in a later stage.

The accumulation block 58 receives the demosaicked A image AD from the A demosaicking portion 543 and the demosaicked R, G, and B images RD, GD, and BD from the RGB demosaicking portion 545 and finds integrated values of pixel data for each color over a given period. That is, accumulated A, R, G, and B values are found.

The accumulation block 58 may calculate the above-described four accumulation values from the output from the synchronizing portion 542 because the ratios of the accumulated values hardly vary before and after demosaicking. Rather, it is desired to calculate the accumulation values from the output from the synchronizing portion 542 in order to calculate the accumulation values at an early stage.

Figure 7:
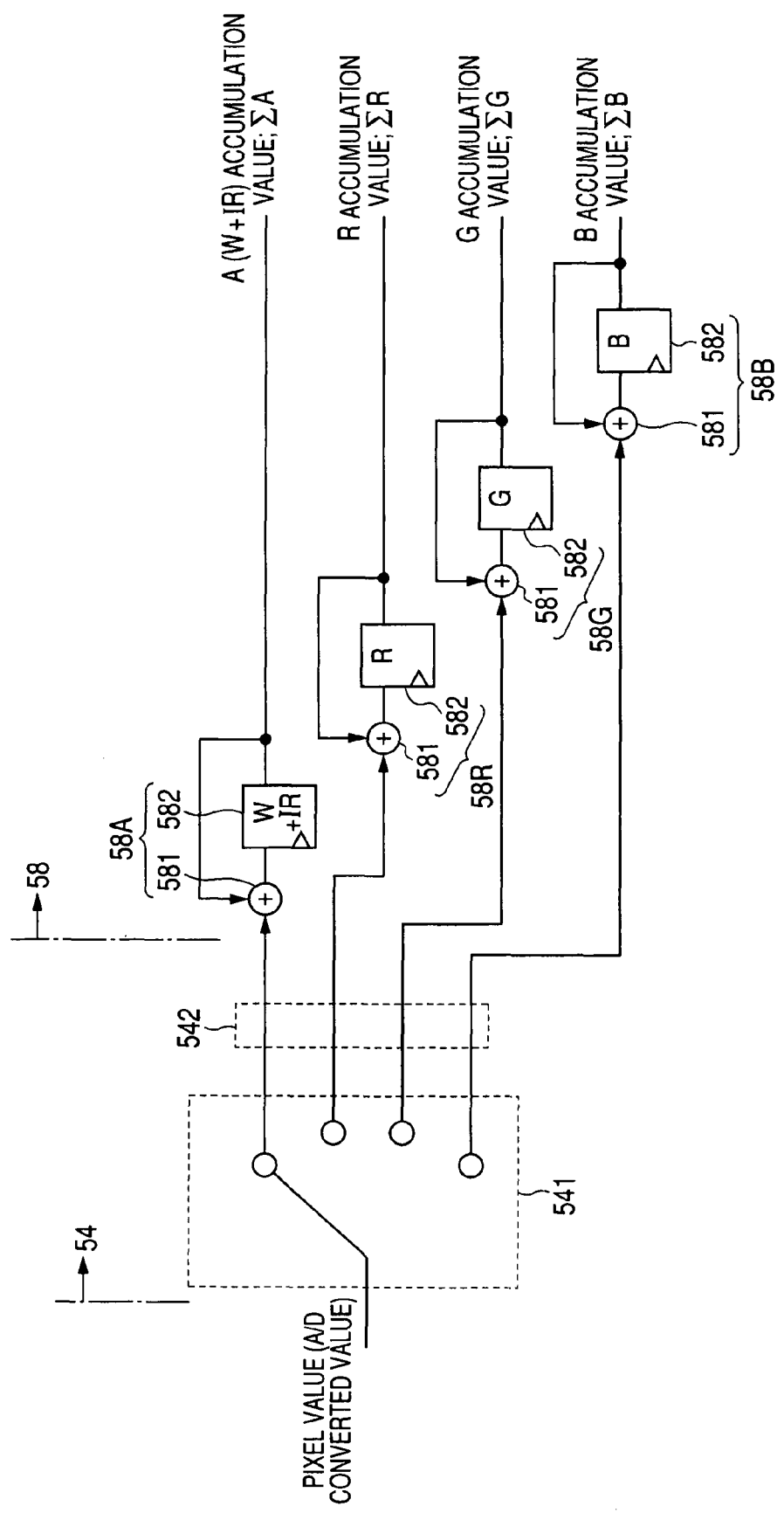
FIG. 7 is a diagram of an accumulation block.

FIG. 7 shows the configuration of the accumulation block 58. FIG. 7 shows the case in which accumulation values are calculated from the output from the synchronizing portion 542.

After the analog imaging signal from the imaging device 2 is converted into digital form, the signal is entered into the PRE block 41 of FIG. 5 and then entered into the noise reduction (NR) block 54 through some processing steps. In the NR block 54, the imaging signal is first entered into the separation portion 541 as shown in FIG. 7. The separation portion 541 operates to sequentially assign the pixel value of the input digitized imaging signal to 4 channels of output in synchronism with the high-speed clock signal. A, R, G, and B pixel values are entered from the four channels of output to the accumulation block 58 via the synchronizing portion 542.

As shown in FIG. 7, the accumulation block 58 is equipped with four separate accumulation portions 58A, 58R, 58G, and 58B corresponding to the four channels, respectively. Each accumulation portion has an adder 581 and delaying means (e.g., a latch circuit 582). The pixel value from the synchronizing portion 542 can be entered into one input terminal of the adder 581. The output of the adder 581 is connected with the input of the latch circuit 582. The output of the latch circuit 582 is connected with the other input terminal of the adder 581.

The adders 581 of the accumulation portions are synchronized by the high-speed clock signal. The latch circuits 582 hold the same data during a period of time corresponding to the interval between the instants of time at which a pixel value and the next pixel value are respectively applied. Therefore, pixel values are accumulated in each adder 581. At the next input instant, the next pixel value is added for accumulation. This operation is performed during a given period, e.g., one frame period. As a result, the accumulation portion 58A receiving the A pixel value produces "A (W+IR) accumulation value $\Sigma A$". Similarly, the accumulation portion 58R receiving the R pixel value produces "R accumulation value $\Sigma R$". The accumulation portion 58G receiving the G pixel value produces "G accumulation value $\Sigma G$". The accumulation portion 58B receiving the B pixel value produces "B accumulation value $\Sigma B$".

The gain adjustment portion 4A shown in FIG. 6 includes some of the functions of the microcomputer 10, and calculates a parameter K based on the four accumulation values (hereinafter referred to as accumulation values $\Sigma$). The parameter K is a coefficient varying according to a relative magnitude between the visible light components and the near-infrared light components. The microcomputer 10 calculates the parameter K according to the following Eq. (1-1) or (1-2). The microcomputer 10 corresponds to one form of the "controller" of the present invention. It is be noted that Eqs. (1-1) and (1-2) merely show examples. Any variable can be used as the parameter K as long as the variable varies according to a relative magnitude between the visible light components and the near-infrared light components of the captured image.

$$K = \sum A - \alpha * \sum R - \beta * \sum G - \gamma * \sum B \quad (1\text{-}1)$$

$$K = \frac{\sum A}{\alpha * \sum R - \beta * \sum G - \gamma * \sum B} \quad (1\text{-}2)$$

where symbols $\alpha$, $\beta$, and $\gamma$ indicate correction coefficients for the colors, respectively. The symbols assume arbitrary values less than 1.

What is meant by these equations is as follows.

The A (W+IR) accumulation value $\Sigma A$ is obtained by accumulating A pixel data outputted from A pixels (see FIGS. 4A and 4B) over one frame of image. This accumulation value indicates the brightness of the whole image displayed on the imaging screen in a corresponding manner to the imaging signal containing both visible light components and near-infrared light components. Meanwhile, the R accumulation value $\Sigma R$ is obtained by accumulating R pixel data outputted from the R pixels over one frame of image, and indicates the magnitude of the R visible light components. Similarly, the G accumulation value $\Sigma G$ indicates the magnitude of the G visible light components. The B accumulation value $\Sigma B$ indicates the magnitude of the B visible light components. Therefore, $(\Sigma A+\Sigma G+\Sigma B)$ indicates the magnitude of the visible light components. Assuming that the white (W) level, i.e., the magnitude of the W visible light components is $\Sigma W$, the following relationship normally holds:

$$(\Sigma A+\Sigma G+\Sigma B)=\Sigma W$$

If the sum of near-infrared light components taken over one frame of image is $\Sigma IR$ and if the correction coefficients satisfy the relationships: $\alpha$, $\beta$, and $\gamma<1$, the above-described Eq. (1-1) can be modified to $$K=\eta 1*\Sigma W+\Sigma IR(\eta 1<1).$$

Furthermore, the above-described Eq. (1-2) can be modified to $$K=\eta 2+\Sigma IR/\Sigma W(\eta 2<1).$$

That is, the two equations indicate the parameter K varying according to the magnitudes of the visible light components $\Sigma W$ and the near-infrared light components $\Sigma IR$. Both equations mean that as the ratio of the magnitude of the visible light components $\Sigma IR$ is increased, the parameter K is increased.

The "$\Sigma A+\Sigma G+\Sigma B$" corresponds to the "first comparative value obtained from the visible light components of the first imaging signals (R, G, and B pixel signals)" of the present invention. "$\Sigma A$" is the "second comparative value obtained by adding the near-infrared light components ($\Sigma IR$) corresponding to the visible light components ($\Sigma W$) to the visible light components ($\Sigma W$) of the second imaging signal (A pixel signal) equivalent to the first comparative value "$\Sigma A+\Sigma G+\Sigma B$". It is obvious from Eqs. (1-1) and (1-2) above that the parameter K is associated with the magnitudes of the first comparative value ($\Sigma A+\Sigma G+\Sigma B$) and second comparative value ($\Sigma A$).

As described so far, increasing the value of the parameter K increases the ratio of one of the first and second comparative values to the other, and vice versa.

The microcomputer 10 acting as a controller adjustably sets the maximum gain value Gmax of the gain amplifier GA shown in FIG. 3A or FIG. 6, based on the calculated parameter K.

Figure 3B:
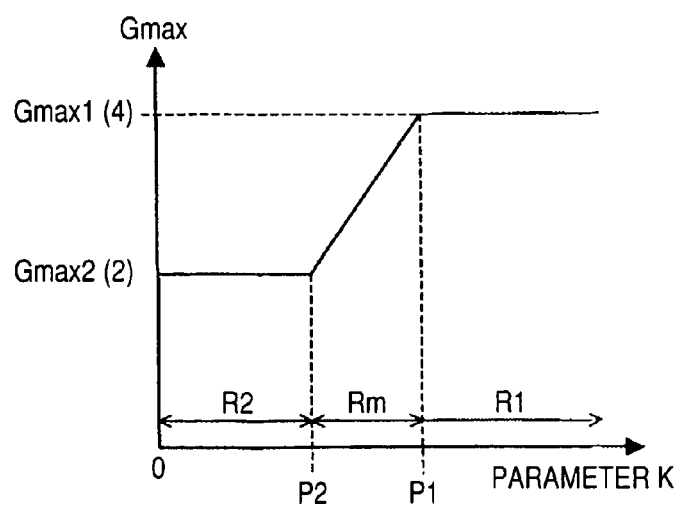
FIG. 3B is a graph showing the relationship of a maximum gain value to a parameter.

One example of control for this operation is shown in the graph of FIG. 3B. As described previously, it is meant that as the parameter K is increased, the ratio of the near-infrared light components $\Sigma IR$ is increased. Therefore, the microcomputer 10 sets the gain amplifier GA at a large first maximum gain value Gmax1. Conversely, it is meant that as the parameter K is reduced, the ratio of the near-infrared light components $\Sigma IR$ decreases. The microcomputer 10 sets the gain amplifier GA at a second maximum gain value Gmax2 smaller than the first maximum gain value Gmax1.

Preferably, a region R1 in which the first maximum gain value Gmax1 is set is set greater than a first reference value P1 of the parameter K. A region R2 in which the second maximum gain value Gmax2 is set is set less than a second reference value P2 of the parameter K (P2<P1).

More preferably, the maximum gain value Gmax to be set is varied linearly or in a stepwise manner from the first maximum gain value Gmax1 to the second maximum gain value Gmax2 in the intermediate region Rm between the first reference value P1 and the second reference value P2 of the parameter K.

If the intermediate region Rm is not formed, the gain value may be flipped between the first maximum gain value Gmax1 and the second maximum gain value Gmax2. The maximum gain value is prevented from being varied greatly and switched frequently by varying the maximum gain value Gmax linearly or in a stepwise manner as described previously. Hence, noisiness felt in the image on the display screen can be prevented from being varied rapidly.

Where it is only necessary to prevent the maximum gain value from being switched frequently, hysteresis characteristics may be imparted to the maximum gain value Gmax.

On the other hand, the gain value G itself is supplied from the microcomputer 10 acting as a controller as shown in FIG. 6 and can be varied.

The gain value G is used, for example, for adjustment of the brightness of the image on the display screen. For instance, automatic exposure control (AE) is provided not based on brightness information from the OPD block 44 of FIG. 6 but based on the brightness information (accumulation value $\Sigma$) from the accumulation block 58. At this time, the microcomputer 10 makes a backlight compensation for brightening the dark subject. The microcomputer also makes a brightness compensation corresponding to the color temperature to brighten the whole image on the display screen when the amount of visible light components is small due to the color temperature of the light source.

One example of control for the operations described above is as follows. Where the brightness of the whole image on the display screen is sufficient but the brightness at the focal point within the image is insufficient, the microcomputer 10 refers to a backlight correction table held, for example, in the nonvolatile memory 11 and reads out appropriate gain value G. Furthermore, the microcomputer 10 reads out the appropriate gain value G by referring to a color temperature brightness correction table held, for example, in the nonvolatile memory 11 according to the value of the parameter K indicating the relative magnitude of the near-infrared light components $\Sigma$IR.

The gain amplifier GA is set at the gain value G read out under control of the microcomputer 10. For example, whenever the brightness information about the image on the display screen varies, the sequence of operations including reading of the appropriate gain value G and resetting (updating) of the gain value G of the gain amplifier GA is repeated.

Where the gain is controlled dynamically in this way, resetting control of the maximum gain value Gmax, for example, shown in FIG. 3B is dynamically repeated with one frame of image being a minimum unit, for example.

In the present embodiment, the maximum gain value Gmax is controlled dynamically because this value is closely associated with noise reduction.

Noise reduction using a cross bilateral filter is first described briefly. This noise reduction includes one example of method of noise reduction according to one embodiment of the invention. Then, the relationship between the noise reduction and control of the maximum gain value will be described.

[Noise Reduction Including a Method of Noise Reduction]

Figure 8:
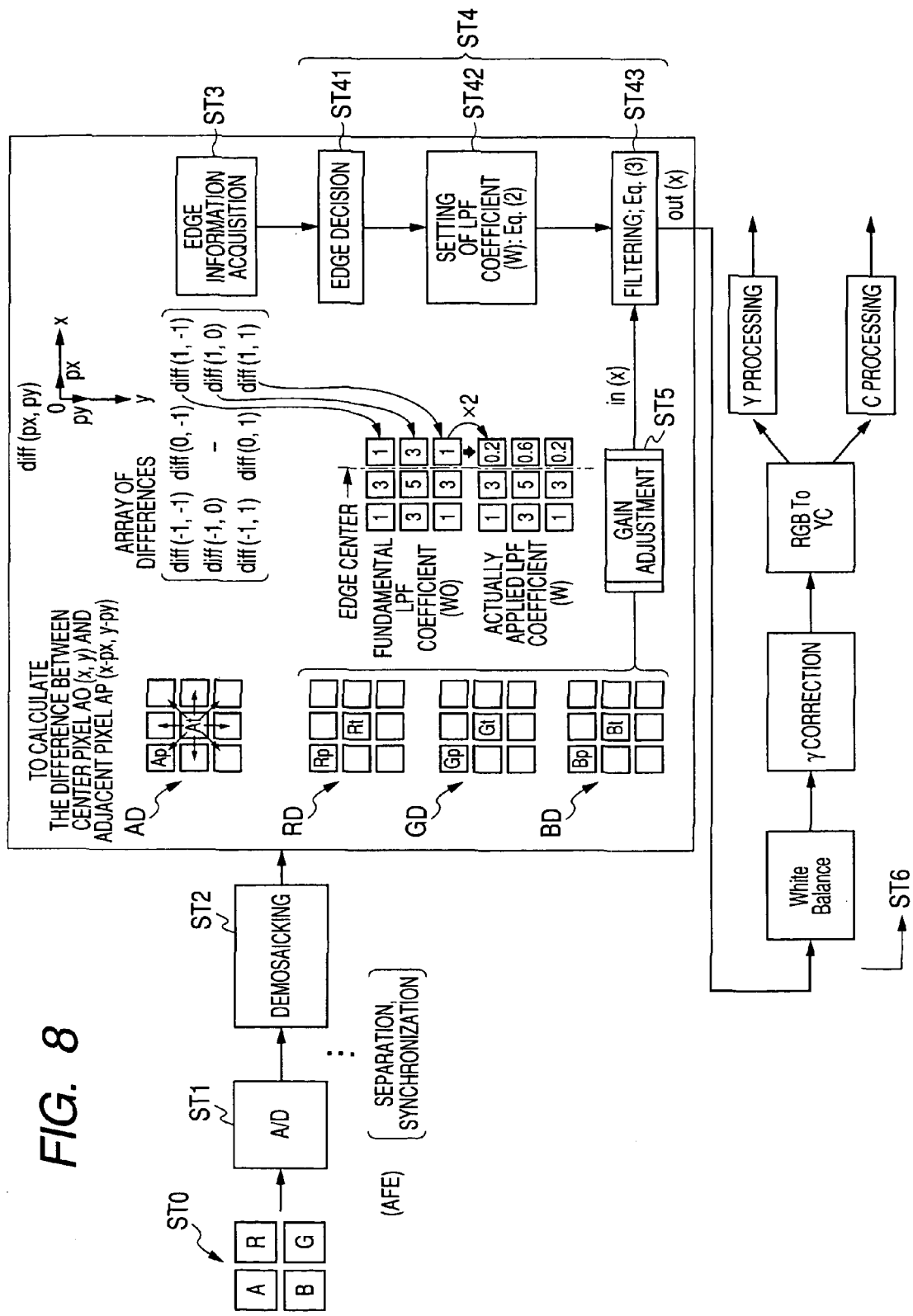
FIG. 8 is a flowchart particularly illustrating edge decision and noise reduction performed after an image is taken.
Figure 13:
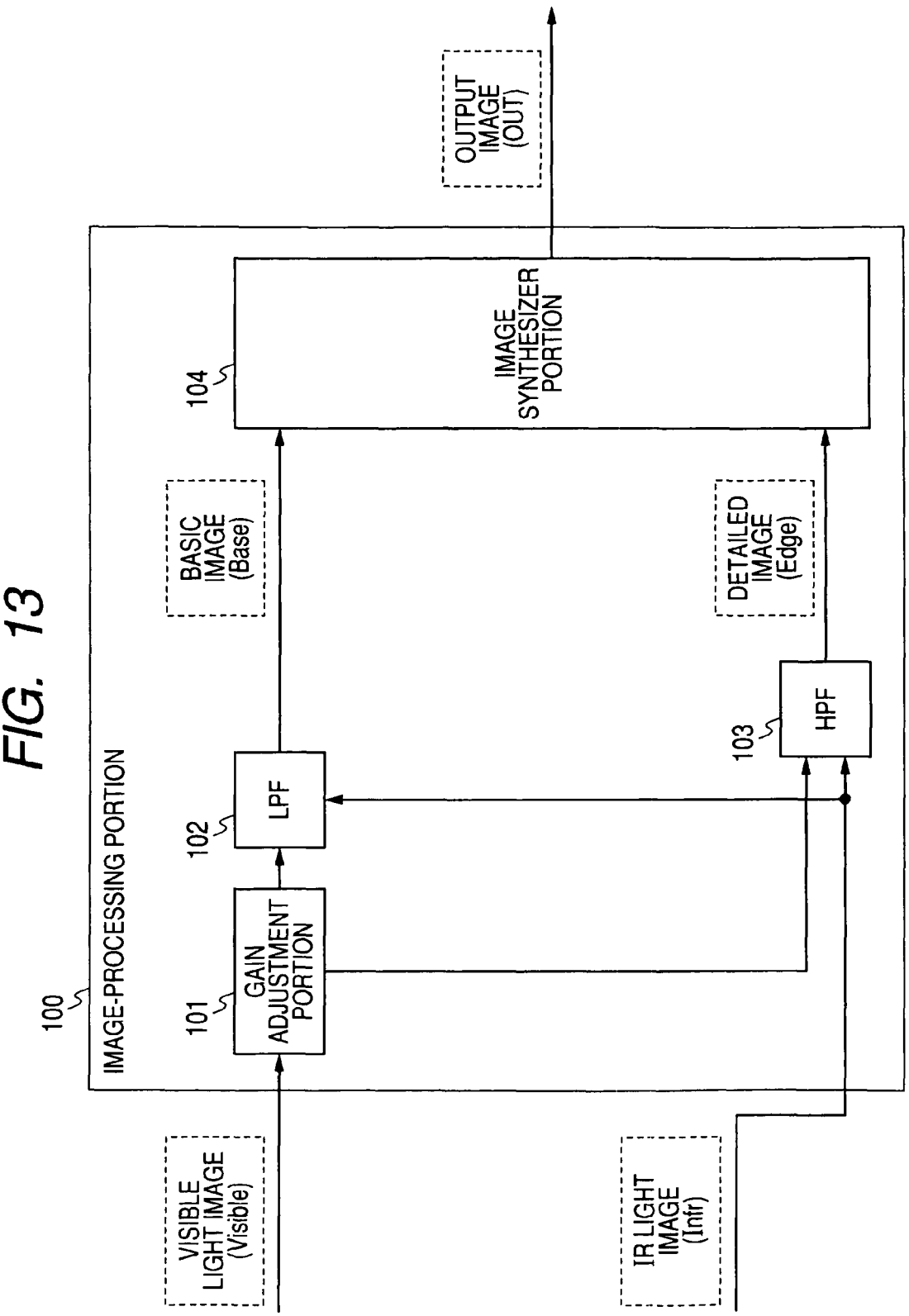
FIG. 13 is a block diagram showing the configuration of an image-processing portion described in patent reference 1.
Figure 14:
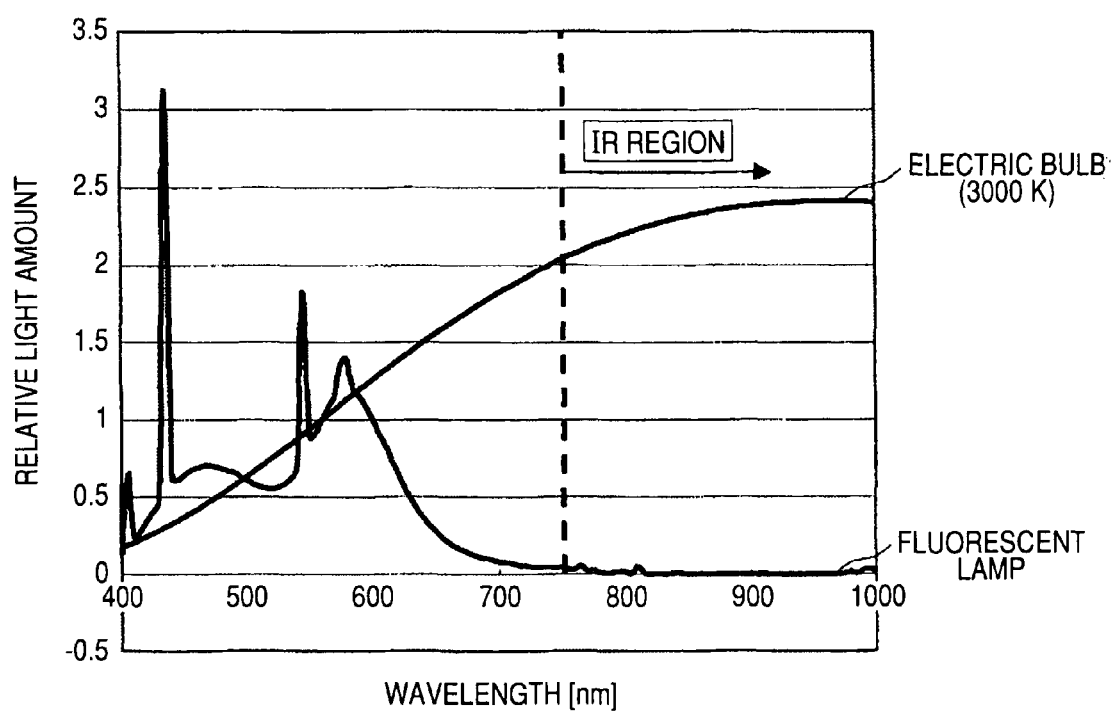
FIG. 14 is a graph showing differences in spectral characteristics between an electric bulb and a fluorescent lamp, each of which acts as a light source.

FIG. 8 is a flowchart illustrating processing performed after the step of capturing an image. The processing schematically illustrates edge decision and noise reduction.

In step STO of FIG. 8, a subject is imaged by an imaging device 2 including color pixels of A, R, G, and B in the same pixel unit.

Then, the obtained analog imaging signal is converted into digital form by the analog-to-digital converter (ADC) 5 shown in FIG. 1 (step ST1). Subsequently, demosaicking is performed by the A demosaicking portion 543 and RGB demosaicking portion 545 shown in FIG. 6 (step ST2). Analog front-end (AFE) processing performed by the AFE circuit 3, separation by the separation portion 541, synchronization performed by the synchronizing portion 542, and other processing are omitted in the figure for convenience of drawing the figure.

In step ST3, edge information is acquired by the edge information acquisition portion 4C shown in FIG. 6. Then, in step ST4, filtering is performed. The filtering of step ST4 includes an edge decision (step ST41), setting of LPF coefficients (step ST42), and filtering (step ST43).

Concurrently with start of step ST3, gain adjustment of step ST5 is started. First, steps ST3 and ST4 are described.

A differential calculator (not shown) such as a subtrator included, for example, in the edge information acquisition portion 4C carries out acquisition of edge information (step ST3) under control of the microcomputer 10.

The computation of the differences may be performed by the microcomputer 10 itself. Where the computation relies on hardware, a differential value computation circuit may be required. The differential value computation circuit calculates the difference D between the pixel value of a target A pixel At and the pixel value of an adjacent A pixel Ap located around the target A pixel At within the range of adjacent pixels, for example, of 3×3 pixels including the target A pixel At as shown in the demosaicked A image AD of FIG. 8.

Demosaicked R, G, and B images RD, GD, and BD corresponding to the 3×3 demosaicked A image AD are shown in FIG. 8, in addition to the demosaicked A image AD corresponding to the demosaicked 3×3 range of adjacent pixels.

The central pixel of the 3×3 demosaicked R image RD is the target R pixel Rt. Similarly, the central pixel of the 3×3 demosaicked G image GD is the target G pixel Gt. The central pixel of the 3×3 demosaicked B image BD is the target B pixel Bt.

These four target pixels are typically always obtained within the same pixel unit shown in FIG. 4A or 4B in the pixel array of the imaging device 2 at the same instant of time stipulated by the clock signal. When the processed object varies sequentially, the four target pixels are shifted one pixel spacing sequentially, for example, in the horizontal direction. Correspondingly, the range of 3×3 adjacent pixels is shifted one pixel spacing in the same direction for each color.

The differential value computation circuit calculates differences diff (px, py) in the demosaicked A image AD in the shown 8 directions. The coordinates (px, py) represent local relative coordinates within an (x, y) absolute position coordinate system taken as shown, the coordinate system corresponding to the pixel addresses in the image on the display screen. The coordinates (px, py) indicate each position relative to the target A pixel At within the demosaicked A image AD. The distance of one pixel interval is indicated by 1.

When the central pixel (target A pixel At) of the demosaicked A image AD is indicated by A0 (x, y) in terms of absolute positional coordinates, adjacent pixels can be indicated by Ap (x-xp, y-yp). Calculation of their difference results in diff (px, py).

Computation of the 8 differences results in an array of differences (numerical matrix) as shown. The obtained edge information ED (array of differences) is sent from the edge information acquisition portion 4C to the noise reduction portion 4B, where the information is subjected to a filtering operation.

FIG. 9 is a diagram conceptually illustrating the edge decision (ST41) and filtering (ST43) included in the above-described filtering operations. FIG. 10 is a diagram conceptually illustrating filtering and setting of LPF coefficients in filtering operations (ST42).

As shown in FIGS. 9 and 10, the noise reduction portion 4B incorporates an edge decision portion 544 for a cross bilateral filter, a filter portion 546, and a filter coefficient setting portion 547.

The edge decision portion 544 may be made of dedicated hardware. Alternatively, the processing sequence may be realized by software loaded in the microcomputer 10. The filter portion 546 is made of a hardware unit including an X-direction filter portion and a Y-direction filter portion. Each of these X- and Y-direction filters includes a shift register, an adder, and a multiplier. The filter setting portion 547 operates to read a fundamental filter coefficient set, for example, from the nonvolatile memory 11 and modify the set. The processing sequence is realized by software loaded in the microcomputer 10.

In setting of filter coefficients (step ST42), the filter setting portion 547 as made of the microcomputer 10 reads a fundamental LPF coefficient W0, for example, from the nonvolatile memory 11. If the edge decision portion 544 determines that there is an edge, the filter setting portion 547 modifies the read fundamental LPF coefficient W0 at a corresponding location.

Specifically, as illustrated in FIG. 10, at the location where the decision "there is an edge" is made, the fundamental LPF coefficient W0 is lowered, and a modified LPF coefficient W (x, px) in the X-direction is calculated. The corresponding portion of the fundamental LPF coefficient W0 is replaced by the calculated LPF coefficient W (x, px). Similarly, an LPF coefficient W (y, py) in the Y-direction is calculated. The corresponding portion of the fundamental LPF coefficient W0 is replaced by the calculated LPF coefficient W (y, py).

The ratio at which the LPF coefficient is lowered may be previously determined by the filter setting portion 547. The coefficient may be dynamically controlled according to the magnitude of a differential value.

One example of method of finding the LPF coefficients, for example, in the X-direction is represented by the following Eq. (2). The calculational formula in the Y-direction is obtained by replacing "x" of Eq. (2) by "y". In the equation, the manner in which the coefficients are lowered is uniquely determined according to dispersion ($\sigma^2$).

$$W(x, px) = \frac{1}{\exp[\{(x-px)^2/2\sigma_s^2\} + \{(edge(x) - edge(px))^2/2\sigma_e^2\}]} \quad (2)$$

where edge (x) indicates each gray level value in the X-direction in the A pixel data (see FIGS. 9 and 10).

The filter portion 546 performs the filtering operation (step ST43) of FIG. 8. For example, in an X-direction filtering operation, R, G, and B pixel data (input in (x)) are received, and output out (x) is produced as illustrated in FIG. 9. Because the input in (x) to the filter portion 546 is any one of R pixel data, G pixel data, and B pixel data obtained after a gain adjustment is made by the gain amplifier GA shown in FIG. 6, the noise level is high. The edge gray level differences are obscured by noises.

On the other hand, the A pixel data contains W pixel data (equivalent to the sum of R, G, and B pixel data) and near-infrared light components IR. Therefore, the A pixel data is originally a large amount of data. It is not necessary to adjust the gain. Therefore, as shown in FIG. 9, the S/N is high, and the edge gray level difference is clear. The edge is obscured by inputting to a filter but is clear in the A image, in the same way as input in (y) to the Y-direction filter and the Y-direction gray level value edge (y) in the A pixel data. This is the reason why A pixel signal data is used in setting the LPF coefficients. It can be seen from Eq. (2) above that the differential value information about the A pixel signal data is reflected in the LPF coefficients W in the portion indicated by the broken line.

The filter portion 546 is a circuit for varying and outputting the gray level value of the target pixel value by attaching weights to the target pixel value of the input in (x) or in (y) and to adjacent 8 pixel values for each color in the bilateral direction, i.e., in each of the X- and Y-directions, using the filter coefficients (weight coefficients) set by the filter setting portion 547. The processing performed by the filter portion 546 is mathematically given by Eq. (3), for example, in the X-direction. The formula in the Y-direction is obtained by replacing "x" of Eq. (3) by "y".

$$\text{out}(x) = \frac{1}{W_{sum}} \cdot \sum_{px=x-n}^{x+n} \text{in}(x) \cdot W(x, px) \quad (3)$$

At this time, the filtering portion 546 shifts the target pixel to successively adjacent pixel positions. Whenever the target pixel is modified, the filtering portion recalculates the LPF coefficients, performs the shifting, and effects filtering. Variation of the target pixel is completely synchronized with operation of the edge information acquisition portion 4C. Filtering represented by Eq. (3) above is performed within a range of adjacent pixels centered at a target pixel. When the filtering is completed, the target pixel is shifted to the next pixel position. Similar processing is performed for the modified target pixel and adjacent 8 pixels.

FIG. 8 conceptually illustrates numerical values of the fundamental LPF coefficient W0. In FIG. 8, for convenience of drawing of the coefficient, the numerical values are indicated by relatively large integral numbers which are different from actual coefficient levels.

Where coefficients of "1", "3", and "1" are arrayed in the direction of one column (in the vertical direction of displayed pixels), if a location almost midway between this column and an adjacent column is judged to be the center of an edge, the coefficients 1, 3, and 1 are lowered. For convenience of illustration, the coefficients are multiplied, for example, by a factor of 0.2. Thus, the coefficients are modified such that the edge is made more clear. The filtering operation is performed using the LPF coefficient set modified in this way.

With an ordinary two-dimensional filter (bilateral filter), edge information diffuses to adjacent pixels if filtering is performed.

On the other hand, in the cross bilateral filter according to the present embodiment, A pixel signal data is used to preserve the steepness of each edge. Fundamental LPF coefficients for noise removal are partially modified. If the optimized LPF coefficients are modified for noise removal, the capability to remove noise may deteriorate. Edges are detected only locally in the whole image on the display screen. Therefore, overall noise reduction can be achieved sufficiently unless strong noise reduction is applied at the location where an edge is judged to be present in this way.

The processing performed as described thus far is repeated for one color while varying the target pixel in the order in which a pixel signal is entered, i.e., in the scanning order. In the image of the color, color information is preserved. The image is approximate to the A pixel distribution as indicated by the output out (x) in the X-direction in FIGS. 9 and 10. That is, mild variations are preserved as color information. However, sudden or random variations are smoothed out. As a result, noise components are reduced (i.e., removed or suppressed).

The same principle applies to the Y-direction and also to the other remaining two colors.

The R, G, and B signals subjected to noise reduction (i.e., signals of demosaicked R, G, B images RD, GD, and BD) are sent from the noise reduction portion 4B to the combining portion 4D.

On the other hand, the edge texture information ET is outputted from the edge information acquisition portion 4C to the combining portion 4D. Some of the demosaicked R, G, and B images RD, GD, and BD corresponding to the edge texture information ET are replaced by the edge texture information ET, thus performing image combination.

The R, G, and B images obtained after image combination are outputted to the C block 43. The demosaicked A image AD is outputted to the Y block 42.

FIG. 8 illustrates the processing performed after the image combination. As shown, an image obtained by the image combination may be first white balanced and gamma (γ) corrected. The gamma-corrected R, G, and B images may be outputted to the Y block 42 for Y processing as shown in FIG. 5 and to the C block 43 for C processing.

FIG. 11 is a flowchart particularly illustrating the gain adjustment (step ST5). Given processing is performed after an image is captured by the imaging device (step ST0). First given processing substeps of the step ST3 including separation, synchronization, and RGB demosaicking are performed. The processing substeps are collectively indicated by ST30 in FIG. 11. Then, the step ST5 is started.

In step ST51, out of the separated imaging signals, signals of the demosaicked R, G, and B images RD, GD, and BD obtained by demosaicking from the R, G, and B signals for which the gain is to be adjusted are applied to the gain adjustment portion 4A.

In the following step ST52, the maximum gain value Gmax is set. In particular, the accumulation block 58 of FIG. 6 finds the A (W+IR) accumulation value ΣA, R accumulation value ΣR, G accumulation value ΣG, and B accumulation value ΣB by cumulatively summing the pixel values, for example, over one frame of image for each color of A, R, G, and B by the circuit configuration shown in FIG. 7.

The microcomputer 10 acting as the controller calculates the parameter K from these accumulation values, for example, using a given formula such as the above-described Eq. (1-1) or (1-2). The appropriate maximum gain value Gmax is found by referring to a given relationship, for example, shown in FIG. 3B. The relationship of FIG. 3B is stored as a table, for example, in the nonvolatile memory 11. The microcomputer 10 determines the maximum gain value Gmax corresponding to the found parameter K by referring to the table. The microcomputer 10 gives the obtained maximum gain value Gmax as the upper limit of the gain of the gain amplifier GA of FIG. 6.

In the gain adjustment of step ST53 shown in FIG. 11, the aforementioned automatic exposure control (AE) is performed. The gain value G corresponding to the brightness of the image on the display screen is given from the microcomputer 10 to the gain amplifier GA. A gain adjustment including normal amplification and attenuation is made for the input signal by the gain amplifier GA at the given maximum gain value Gmax. After the gain adjustment, the R, G, and B signals are outputted from the gain amplifier GA to the noise reduction portion 4B for filtering in step ST43.

As described so far, in the present embodiment, for example, the magnitude of the parameter K determines whether the amount of the near-infrared light components contained in the R, G, and B signals (the second imaging signals) is large or small during gain adjustment (ST5) made before noise-reducing filtering (step ST43). During the gain adjustment, the maximum gain value Gmax is set or restricted according to the magnitude of the parameter K. In the present embodiment, the maximum gain value Gmax can be varied to a different value according to the parameter K (FIG. 3B).

During the noise-reducing filtering (step ST43), there is a limitation in noise reduction due to the input dynamic range. If the limitation is exceeded, noise in the output image (the output out from the filter portion 546 of FIGS. 9 and 10) increases rapidly. The limitation varies, depending on the noise level, as well as on the signal level of the input in to the filter portion 546. As the gain of the signal-processing route from the imaging device to the noise-reducing stage increases, the noise level contained in the signal increases. Generally, however, noise produced by the imaging device is suppressed to some extent by signal processing performed inside the device. Therefore, noise produced by an amplifier existing in the route from the imaging device to the noise-reducing stage (e.g., the gain amplifier GA) mainly dominates the noise level that determines the limitation in the noise reduction.

That is, the limitation in noise reduction beyond which the noise level increases rapidly is associated with the signal level actually subjected to noise reduction and with the gain when the signal is adjusted to that signal level.

In the camera device (video input processor) of the present embodiment, the imaging signal-generating portion (configuration preceding the gain adjustment portion 4A in the order of signal inputting) is designed to be capable of producing the R, G, and B images (first imaging signals) containing the visible light components and the A image (second imaging signal) including the near-infrared light components. If a relative magnitude between the visible light components (Σ(R+G+B)≈ΣW) of the first imaging signals (R, G, and B signals) and the near-infrared light components (ΣIR) of the second imaging signals (A signal) is known, it is possible to forecast the relative magnitude of the limitation in noise reduction beyond which the noise level increases rapidly. The gain adjustment portion 4A can calculate the relative magnitude of the light components, for example, as the parameter K. As a result, the maximum gain value Gmax can be adjustably set such that the limitation in the noise-reducing capability is not exceeded.

Because of the configuration described so far, if environmental variations occur such as when the light source used when the subject is imaged becomes different or the color temperature of the light source varies, the noise-reducing capability is not impaired during the noise reduction. Therefore, the noise reduction assures that a high-quality image is outputted at all times.

A detailed image of an edge portion is extracted as the edge texture information ET and synthesized. Therefore, where noise reduction does not produce fruitful effects at edge portions or where the color is made different due to filtering, the original noise level and color information can be preserved.

As a modification of the present invention, an infrared lamp 15 acting as a near-infrared light emission portion is mounted on the front surface of the camera device where the optical components 1 are also mounted as shown in FIG. 12, the front surface facing toward the subject.

When the gain adjustment portion 4A has determined that the level of the near-infrared light components (ΣIR) is lower than a given reference level, the infrared lamp 15 is lit up, for example, under control of the microcomputer 10.

Therefore, under a light source that does not offer a sufficient amount of near-infrared light, the light amount itself incident on the imaging device 2 from the subject can be increased. As a result, a high-sensitivity image of stable image quality can be obtained, because unreasonable processing relying on an image with low S/N ratio is not performed.

According to the present embodiment described so far, the aforementioned problem (i.e., the noise-reducing capability becomes different according to the proportion of the contained infrared light components and, sometimes, the limitation in noise reduction is exceeded, producing a noisy output image) can be effectively prevented. Furthermore, the amount of near-infrared light is increased by utilizing the result of a decision made as to whether the level of near-infrared light components is sufficient or not. Consequently, a high-sensitivity image is obtained. Hence, noise reduction can be performed reasonably.

It should be understood by those skilled in the art that various modifications, combinations, sub-combinations and alterations may occur depending on design requirements and other factors insofar as they are within the scope of the appended claims or the equivalents thereof.

What is claimed is:

1. A video input processor comprising:
an imaging signal-generating portion configured to image a subject and producing first imaging signals containing visible light components and a second imaging signal containing near-infrared light components;
a gain adjustment portion configured to adjustably set a maximum gain value according to a relative magnitude between the visible light components and the near-infrared light components and adjust a gain for the first imaging signals at the set maximum gain value; and
a noise reduction portion configured to reduce noises in the first imaging signals after the gain has been adjusted.

2. A video input processor as set forth in claim 1, wherein the second imaging signal includes visible light components equivalent to the visible light components of the first imaging signals and near-infrared light components corresponding to the amount of near-infrared light emanating from the subject, and wherein the gain adjustment portion calculates a parameter associated with a relative magnitude between a first comparative value obtained from the visible light components of the first imaging signals based on the first and second imaging signals from the imaging signal-generating portion and a second comparative value obtained by adding near-infrared light components corresponding to the visible light components of the second imaging signal to the visible light components of the second imaging signal equivalent to the first comparative value and adjustably setting the maximum gain value based on the magnitude of the parameter.

3. A video input processor as set forth in claim 1, wherein the gain adjustment portion calculates the parameter indicating the relative magnitude, sets a first maximum gain value in a region where the parameter is in excess of a first reference value and a relatively large amount of near-infrared light components is contained, sets a second maximum gain value smaller than the first maximum gain value in a region where the parameter is less than a second reference value and a relatively small amount of near-infrared light components is contained, and varies the maximum gain value to be set linearly or in a stepwise manner from the first maximum gain value to the second maximum gain value in a region where the parameter is smaller than the first reference value but greater than the second reference value.

4. A video input processor as set forth in any one of claims 2 and 3, wherein the gain adjustment portion has:
plural accumulation portions configured to calculate accumulation values of the visible light components of the first imaging signals and the near-infrared light components of the second imaging signal over a given period of time;
a variable gain amplifier configured to receive the first imaging signals and adjusting the gain for the received first imaging signals; and
a controller configured to calculate the parameter from the accumulation values obtained by the accumulation portions and adjustably set the maximum gain value of the variable gain amplifier, based on the magnitude of the parameter.

5. A video input processor as set forth in claim 4, wherein the plural accumulation portions include an exposure accumulation portion capable of accumulating a sum of the magnitude of the visible light components and the magnitude of the near-infrared light components over a given number of frames of image and detecting a brightness of an image on a display screen of an imaging device, the sum corresponding to light emanating from the subject, and wherein the controller controls the gain value of the variable gain amplifier according to an accumulation value from the exposure accumulation portion.

6. A video input processor as set forth in claim 1, further comprising an edge information acquisition portion configured to acquire edge information from the second imaging signal, and wherein the noise reduction portion reduces noises in the first imaging signals for each color while preserving edge information at image locations recognized based on the edge information.

7. A video input processor as set forth in claim 1, further comprising a near-infrared light emission portion configured to irradiate the subject with a given amount of near-infrared light when the gain adjustment portion has determined that the amount of the near-infrared light components is smaller than a given reference level.

8. An imaging signal-processing circuit for receiving first imaging signals containing visible light components and a second imaging signal containing near-field light components and reducing noises in the first imaging signals, the imaging signal-processing circuit comprising:
a gain adjustment portion configured to adjustably set a maximum gain value according to a relative magnitude between the visible light components and the near-infrared light components and adjust a gain for the first imaging signals at the set maximum gain value; and
a noise-reducing portion configured to reduce noises in the first imaging signals after the adjustment of the gain for each color.

9. A method of reducing noises in imaging signals, comprising the steps of:
acquiring first imaging signals containing visible light components and a second imaging signal containing near-infrared light components;
adjustably setting a maximum gain value according to a relative magnitude between the visible light components and the near-infrared light components;
adjusting a gain for the first imaging signals at the set maximum gain value; and
reducing noises in the first imaging signals after the adjustment of the gain.

10. A method of reducing noises in imaging signals as set forth in claim 9, further comprising the step of irradiating the subject with a given amount of near-infrared light when it is determined that the level of the near-infrared light components is less than a given reference level.

11. An electronic device comprising:
an imaging signal-generating portion configured to image a subject and generating first imaging signals containing visible light components and a second imaging signal containing near-infrared light components;
a gain adjustment portion configured to adjustably set a maximum gain value according to a relative magnitude between the visible light components and the near-infrared light components and adjust a gain for the first imaging signals at the set maximum gain value;
a noise reduction portion configured to reduce noises in the first imaging signals after the adjustment of the gain; and
a controller configured to produce a control signal for controlling the gain adjustment portion.

* * * * *